US 6,505,586 B1
(12) United States Patent
Sato et al.

(10) Patent No.: US 6,505,586 B1
(45) Date of Patent: Jan. 14, 2003

(54) VARIABLE VALVE TIMING CONTROL APPARATUS AND METHOD FOR ENGINES

(75) Inventors: Osamu Sato, Takahama (JP); Motohiro Okada, Obu (JP); Masaomi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 23 days.

(21) Appl. No.: 09/632,207

(22) Filed: Aug. 3, 2000

(30) Foreign Application Priority Data

Aug. 5, 1999 (JP) .......................................... 11-222031
Aug. 5, 1999 (JP) .......................................... 11-223065
Aug. 17, 1999 (JP) .......................................... 11-230430

(51) Int. Cl.$^7$ ................................................. F01L 1/34
(52) U.S. Cl. ............................... 123/90.17; 123/90.15; 123/90.16; 74/568 R; 464/1
(58) Field of Search ........................... 123/90.15, 90.16, 123/90.17, 90.12, 90.31; 74/568 R; 464/1, 2, 160

(56) References Cited

U.S. PATENT DOCUMENTS

| 5,537,961 A | * | 7/1996 | Shigeru ................... 123/90.15 |
| 5,738,056 A | * | 4/1998 | Mikame et al. |
| 5,797,361 A | * | 8/1998 | Mikame ................... 123/90.17 |
| 6,035,819 A | * | 3/2000 | Nakayoshi et al. |
| 6,047,674 A | * | 4/2000 | Kadowaki ................ 123/90.15 |

FOREIGN PATENT DOCUMENTS

| JP | A-9-324613 | 12/1997 |
| JP | A-11-62521 | 3/1999 |
| JP | A-11-210424 | 8/1999 |
| JP | A-11-241608 | 9/1999 |

* cited by examiner

Primary Examiner—Thomas Denion
Assistant Examiner—Jaime Corrigan
(74) Attorney, Agent, or Firm—Nixon & Vanderhye P.C.

(57) ABSTRACT

A variable valve timing control apparatus is constructed so as to supply hydraulic pressure to an unlocking chamber for unlocking a lock pin only from a retarding chamber. In cranking an engine, a hydraulic pressure control valve is controlled so as to supply the hydraulic pressure only to an advancing chamber and so as not to apply the hydraulic pressure to the unlocking chamber. Thereby, the lock pin is prevented from being unlocked in cranking the engine in advance. After that, control current of a solenoid of the hydraulic pressure control valve is switched to hold current for holding the position of the camshaft phase at the point of time when a time necessary for enabling to supply the hydraulic pressure sufficient to control the camshaft phase from the completion of cranking to supply the hydraulic pressure equally to the both advancing and retarding chambers. Thereby, the hydraulic pressure is supplied also to the unlocking chamber from the retarding chamber and the lock pin is unlocked.

15 Claims, 28 Drawing Sheets

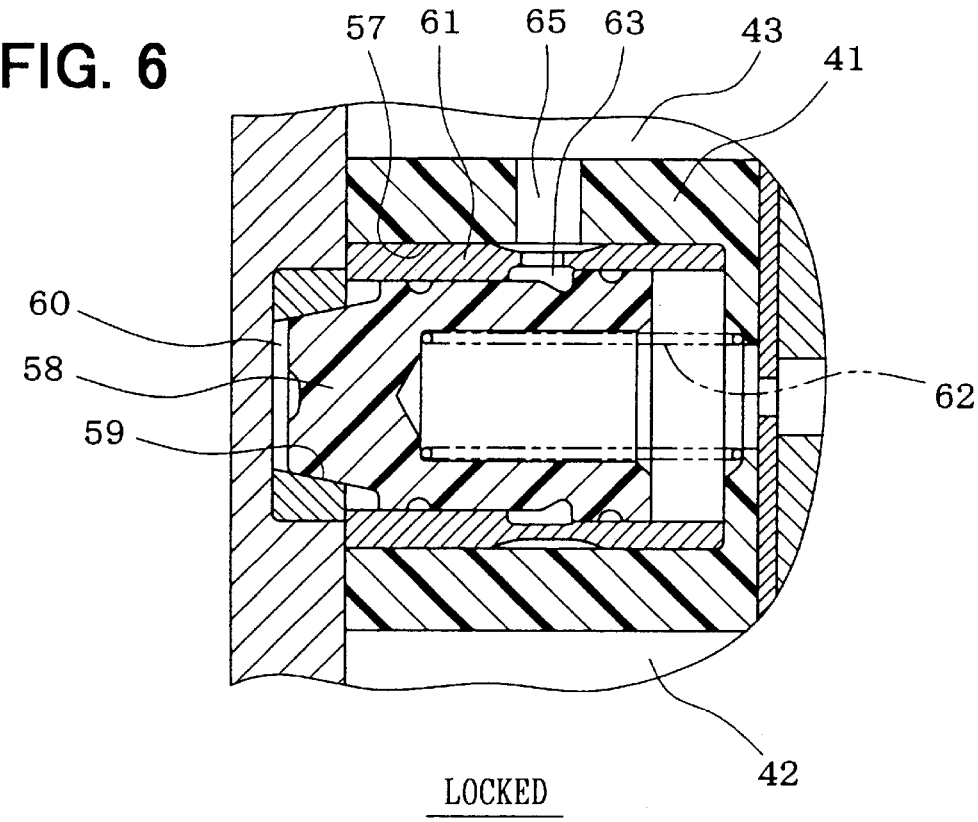
FIG. 6 LOCKED
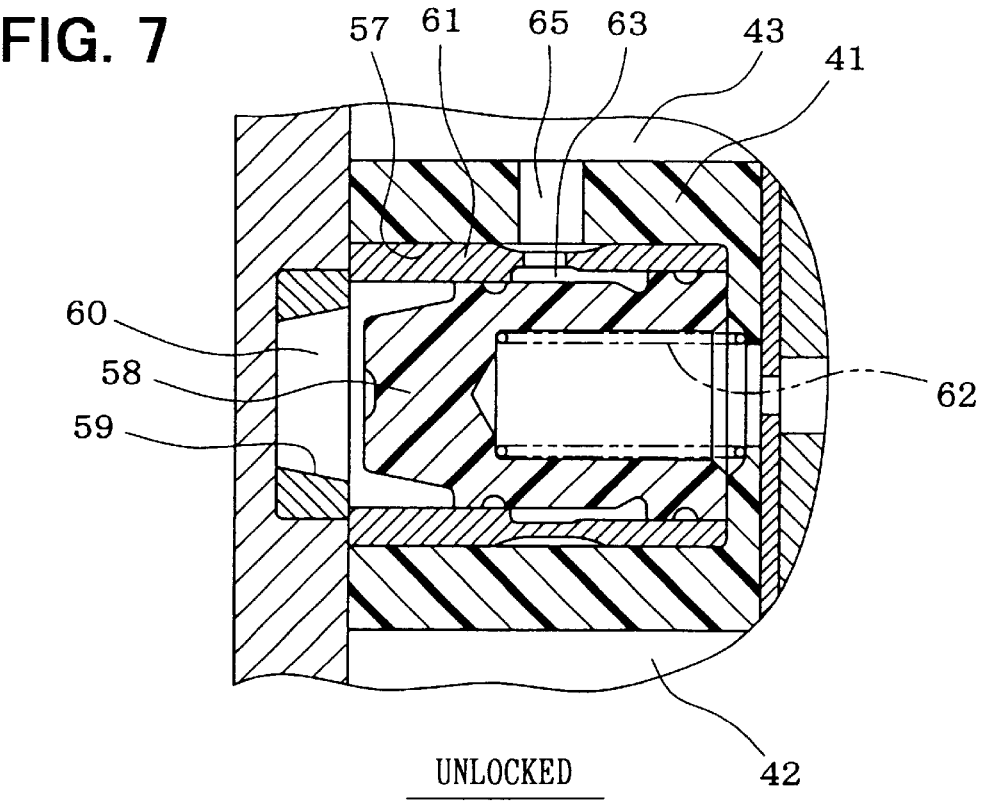
FIG. 7 UNLOCKED

LOCKED

UNLOCKED

VARIABLE VALVE TIMING CONTROL APPARATUS AND METHOD FOR ENGINES

CROSS REFERENCE TO RELATED APPLICATION

This application relates to and incorporates herein by reference Japanese Patent Applications No. 11-222031 filed Aug. 5, 1999, No. 11-223065 filed Aug. 5, 1999 and No. 11-230430 filed Aug. 17, 1999.

BACKGROUND OF THE INVENTION

1. Field of the Invention

The present invention relates to a variable valve timing control apparatus for internal combustion engines.

2. Related Art

The use of an internal combustion engine using a variable valve timing control apparatus in a vehicle is now increasing to enhance its output, to save fuel consumption and to reduce emission of exhaust gas. A vane type variable valve timing control apparatus comprises, as shown in FIG. 36, a housing 1 which rotates or turns in synchronism with a crankshaft of the engine, a rotor 2 connected to an intake or exhaust valve camshaft and disposed concentrically with the housing 1, and fluid chambers 3 formed in the housing 1 and parted as advancing chambers 5 and retarding chambers 6 by vanes 4 provided on the rotor 2.

The valve timing is variably controlled by changing rotational angular phase of the camshaft or "phase of camshaft" with respect to the crankshaft by relatively turning the housing and the rotor 2 (vanes 4) by controlling hydraulic pressure of the advancing chamber 5 and the retarding chamber 6 by a hydraulic pressure control valve.

JP-A-9-324613 proposes a method of enlarging a controllable range of the valve timing (phase of camshaft) by setting lock phase in stopping the engine almost at the intermediate position of the controllable range of the camshaft phase.

However, in this arrangement, the hydraulic pressure of the both advancing and retarding chambers 5 and 6 operates always in the unlocking direction. As a result, a lock pin 7 is unlocked sometimes when the hydraulic pressure of either one of the advancing chamber 5 and the retarding chamber 6 first becomes high, even though the hydraulic pressure of the other one is low, due to the increase of the hydraulic pressure caused by the increase of engine speed (number of revolutions of oil pump) in cranking the engine.

The camshaft phase changes suddenly at the moment of unlock and the valve timing cannot be controlled to the target value because the hydraulic pressure of the other one is low even when the lock is released in such state. As a result, because the engine is cranked at the inadequate valve timing, the startability is aggravated, the engine start time is prolonged or the engine operating state after the start becomes unstable until when the hydraulic pressure increases. Still more, the vane 4 hits the housing 1, thus causing noise, because the position of the vane 4 is not fixed until when the hydraulic pressure increases.

The camshaft phase also changes suddenly to the side where the hydraulic pressure is high at the moment of unlock, thus causing the actual valve timing (phase of camshaft) to deviate largely from the target value. Therefore, an abnormality checking system for determining whether or not the variable valve timing control apparatus is abnormal erroneously determines sometimes that the transient behavior of the camshaft phase in unlocking (releasing the lock) is abnormal.

When the engine is stopped during cold ambient conditions before the oil temperature rises, oil is hardly pulled out of a lock hole. The lock pin 7 is hardly fitted into the lock hole when the engine is stopped because the viscosity of the oil within the hydraulic circuit is large and the fluidity of the oil is bad. The lock pin 7 is hardly fitted into the lock hole, when the motion of the camshaft phase is slow due to a fault or the like. When the lock pin 7 is unlocked while operating the engine in these cases, the lock pin 7 is hardly fitted into the lock hole and the camshaft phase cannot be locked at the intermediate lock phase in stopping the engine afterward.

When the camshaft phase cannot be locked at the intermediate lock phase in stopping the engine, the valve timing (phase of camshaft) cannot be controlled to the target value (around the intermediate lock phase) until when the engine speed increases and the hydraulic pressure increases. As a result, because the engine is cranked with valve timing deviated away from the target value, startability is bad and it takes time to crank the engine. Still more, because the position of the vane 4 is not fixed until the hydraulic pressure increases, when the engine is cranked without locking the camshaft phase, the vane 4 hits the housing 1, thus causing noise.

SUMMARY OF THE INVENTION

Accordingly, a primary object of the invention is to provide a variable valve timing control apparatus for internal combustion engines which can reliably prevent the camshaft phase from being unlocked in cranking the engine.

A secondary object of the invention is to improve the reliability of a system for checking abnormality by preventing it from erroneously determining the transient behavior of the camshaft phase right after the unlock as being abnormal in advance.

A tertiary object of the invention is to avoid the problems of the bad startability, noise and others caused by the failure of the lock by preventing the engine from cranking in the state in which the camshaft phase is not locked.

In order to achieve the primary object of the invention, a fluid pressure control is controlled so that no fluid pressure which otherwise causes unlock is applied to a lock releasing chamber of a locking part in cranking an engine. Thereby, it becomes possible to reliably prevent the camshaft phase from being unlocked in cranking the engine and to improve startability, controllability of the engine and noise which are otherwise caused by the careless unlock.

In order to achieve the secondary object of the invention, abnormality check condition is relaxed or lowered in unlocking the lock part. Thereby, it becomes possible to prevent the transient behavior of the camshaft phase right after the unlock from being erroneously determined as being abnormal in advance. Still more, because the process for checking abnormality may be continued by the relaxed abnormality check condition even when the lock is unlocked, the abnormality may be detected quickly if the abnormality has occurred. Thus, it is possible to achieve both the functions of detecting abnormality quickly and of preventing erroneous detection.

In this case, the abnormality check condition may be returned to normal values after an elapse of a certain period after detecting that the lock part is unlocked. Thereby, the abnormality check condition may be returned after the control of the camshaft phase is stabilized after the unlock. The period until when the control of the camshaft phase is stabilized after the unlock changes depending on the viscosity of oil (fluidity of oil) within a hydraulic circuit at that time and the viscosity of oil changes depending on oil temperature. Because the oil temperature correlates with coolant temperature and engine temperature, the coolant temperature or the engine temperature may be used as substitute information of the oil temperature.

In order to achieve the tertiary object of the invention, unlock of the lock part may be inhibited until when the camshaft phase becomes movable after cranking the engine. Thereby, the internal combustion engine may be stopped in the state in which the camshaft phase is locked by the lock part by stopping the internal combustion engine before the camshaft phase becomes movable after cranking the engine. Therefore, it becomes possible to crank the engine next time in the state in which the camshaft phase is locked firmly by the lock part and to avoid aggravation of startability and noise which are otherwise caused by the failure of the lock.

In this case, it is possible to check whether or not the camshaft phase is movable based on information on temperature such as oil temperature, coolant temperature and engine temperature by taking into account that the motion of the camshaft phase changes depending on the viscosity (oil temperature) of oil within the hydraulic circuit.

BRIEF DESCRIPTION OF THE DRAWINGS

Other objects, features and advantages of the present invention will become more apparent from the following detailed description made with reference to the accompanying drawings. In the drawings:

FIG. 6 is a partially enlarged sectional view showing the state in which a lock pin of the first embodiment is locked;

FIG. 7 is a partially enlarged sectional view showing the state in which the lock pin of the first embodiment is unlocked;

DETAILED DESCRIPTION OF THE PREFERRED EMBODIMENT

First Embodiment

A first embodiment in which the present invention is applied to a variable valve timing control apparatus of an intake valve will be explained below with reference to FIGS. 1 through 12.

Figure 1:
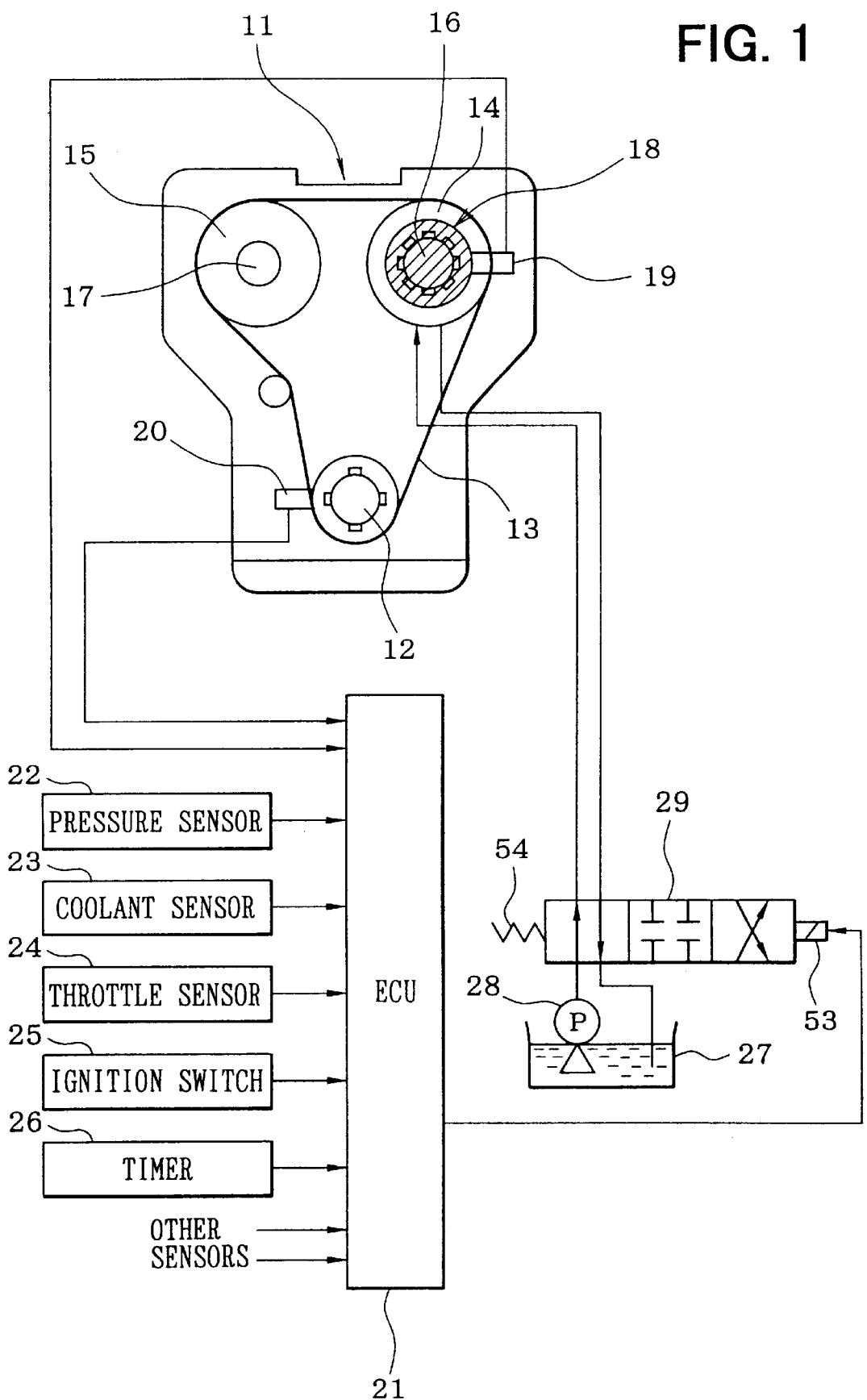
FIG. 1 is a schematic structural view of the whole control system of a first embodiment of the invention.

As shown in FIG. 1, power from a crankshaft 12 is transmitted to an intake side camshaft 16 and an exhaust side camshaft 17 by a timing chain 13 via sprockets 14 and 15 in a DOHC engine 11, i.e., an internal combustion engine. However, a valve timing regulating unit 18 for regulating an advance angle of the intake side camshaft 16 with respect to the crankshaft 12 is provided at the intake side camshaft 16. A cam angle sensor 19 for detecting a cam angle is provided at the periphery of the intake side camshaft 16 and a crank angle sensor 20 for detecting a crank angle is provided at the periphery of the crankshaft 12.

Output signals of these crank angle sensor 20 and the cam angle sensor 19 are inputted to an engine control unit (ECU) 21. The engine control unit 21 calculates actual valve timing of the intake valve as well as an engine speed from frequency of output pulses of the crank angle sensor 20. Output signals of various sensors for detecting the engine operating conditions such as an intake pressure sensor 22, a coolant water temperature sensor 23 and a throttle sensor 24 as well as output signals of an ignition switch 25 and a timer 26 are also inputted to the engine control unit 21.

Based on these various input signals, the engine control unit 21 executes fuel injection control and ignition control and controls the valve timing regulating unit 18 so that the actual valve timing (actual advance angle of the intake side camshaft 16) of the intake valve coincides with target valve timing (target advancing angle) by making variable valve timing control described later. Oil within an oil pan 27 is supplied to a hydraulic circuit of the valve timing regulating unit 18 by an oil pump 28 via a oil pressure control valve (fluid pressure control means). The actual advancing angle (actual valve timing) of the intake side camshaft 16 may be controlled by controlling the hydraulic pressure by the oil pressure control valve 29.

Next, the structure of the valve timing regulating unit 18 will be explained based on FIGS. 2 through 5. A housing 31 (first rotary body) of the valve timing regulating unit 18 is fastened and fixed to the sprocket 14 rotatably supported at the periphery of the intake side camshaft 16 by a bolt 32. Thereby, the rotation of the crankshaft 12 is transmitted to the sprocket 14 and the housing 31 via the timing chain 13 and the sprocket 14 and the housing 31 rotates in synchronism with the crankshaft 12.

Meanwhile, the intake side camshaft 16 is rotatably supported to a cylinder head 33 and a bearing cap 34 and a rotor (second rotary body) 35 is fastened and fixed to one end of the intake side camshaft 16 by a bolt 37 via a stopper 36. The rotor 35 is stored relatively rotatably within the housing 31.

Figure 2:
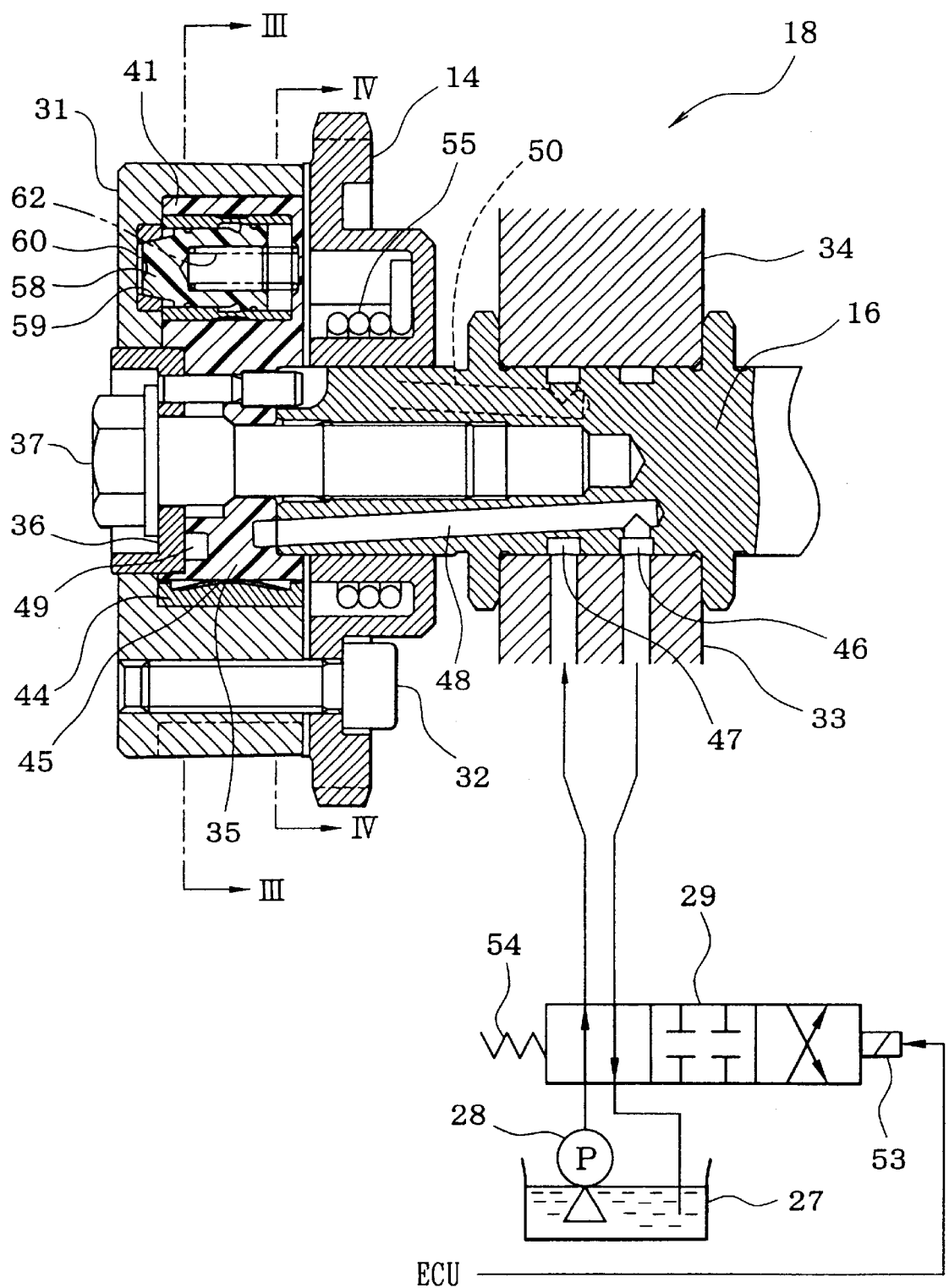
FIG. 2 is a longitudinal sectional view of a valve timing regulating unit of the first embodiment.
Figure 3:
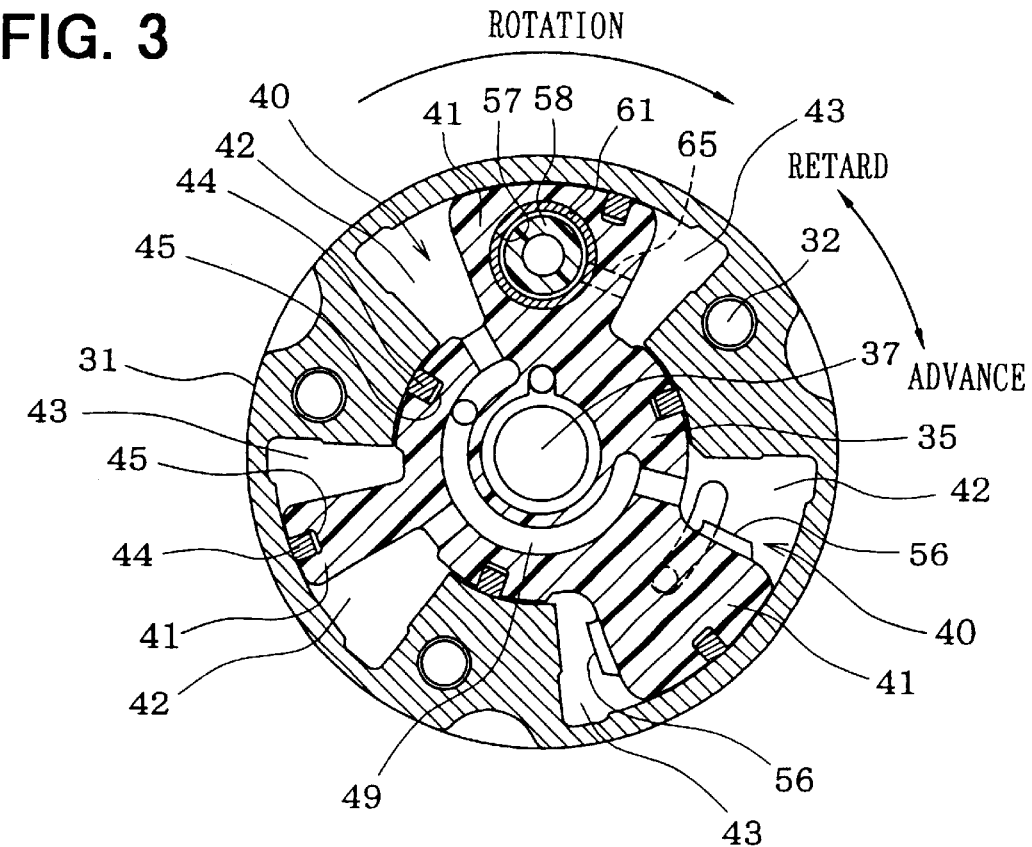
FIG. 3 is a sectional view taken along a line III—III in FIG. 2.
Figure 4:
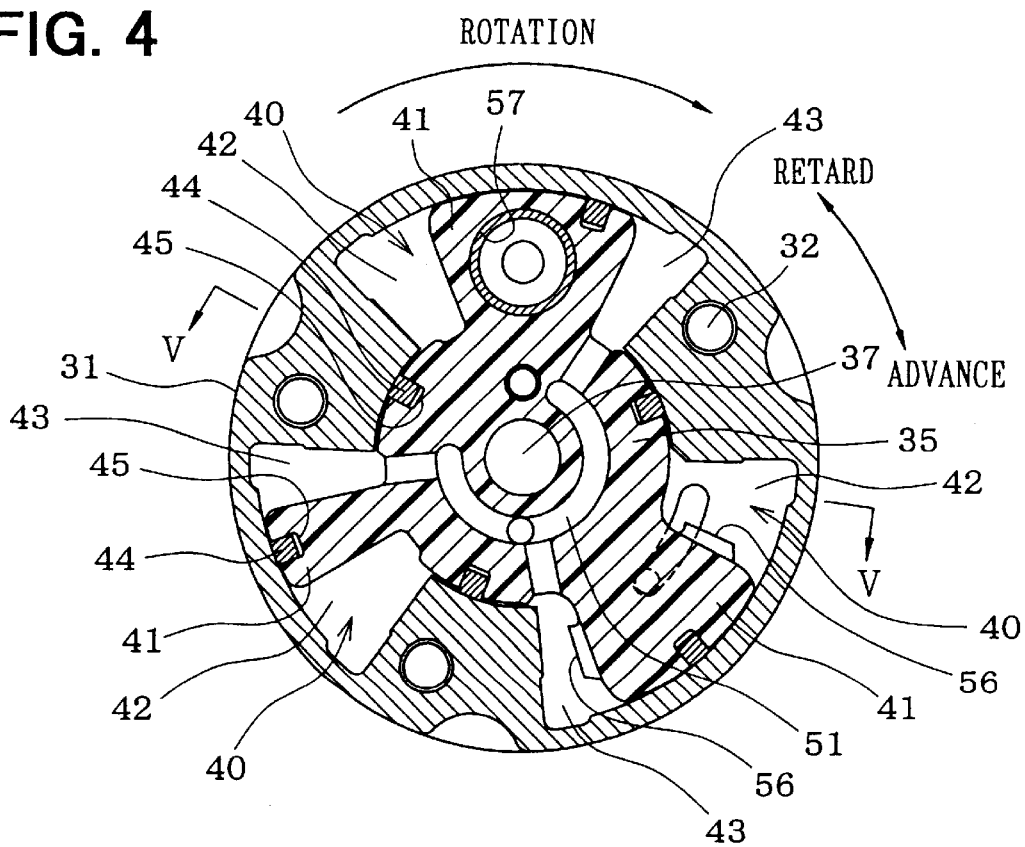
FIG. 4 is a sectional view taken along a line IV—IV in FIG. 2.
Figure 5:
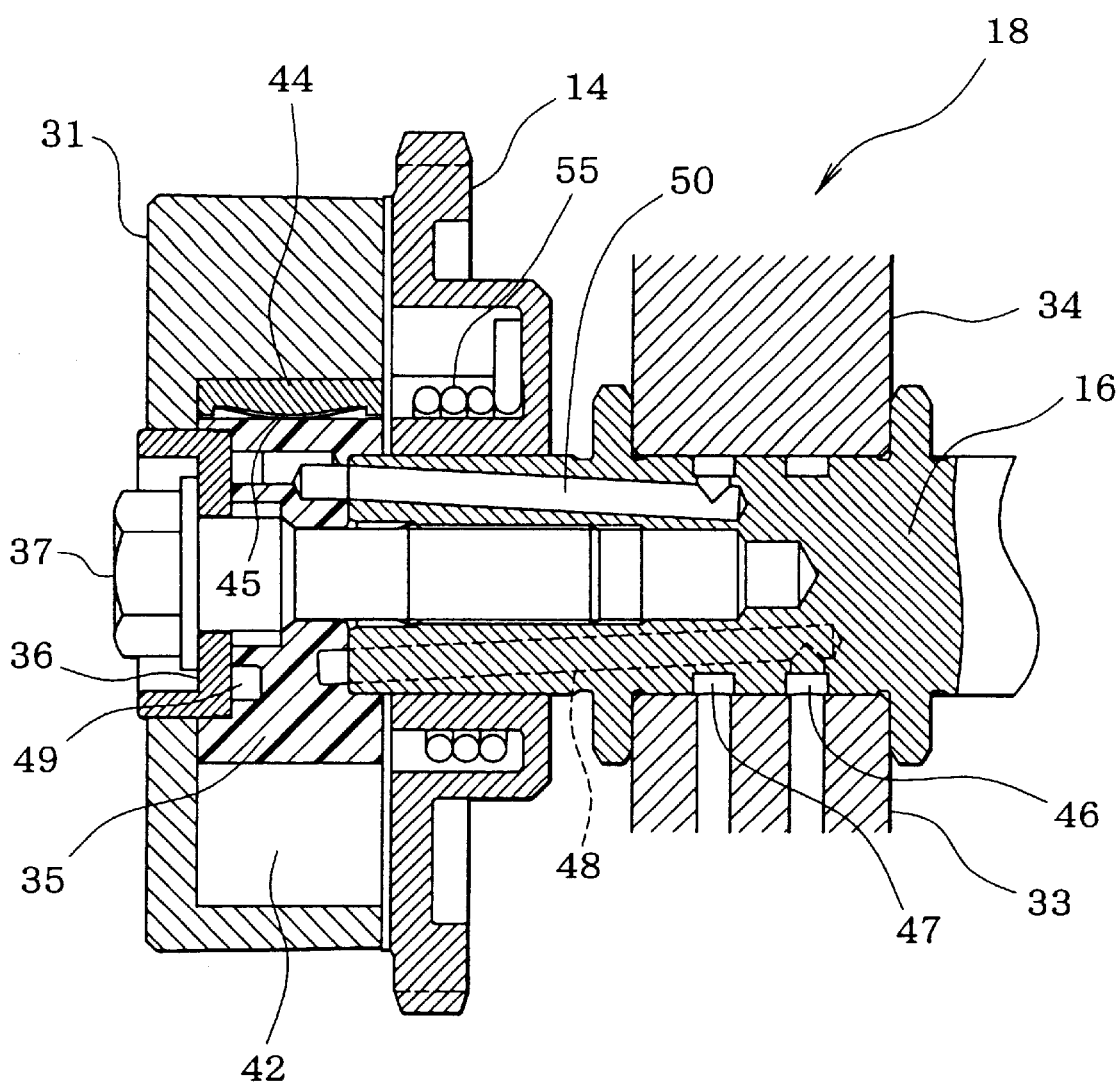
FIG. 5 is a sectional view taken along a line V—V in FIG. 4.
Figure 8:
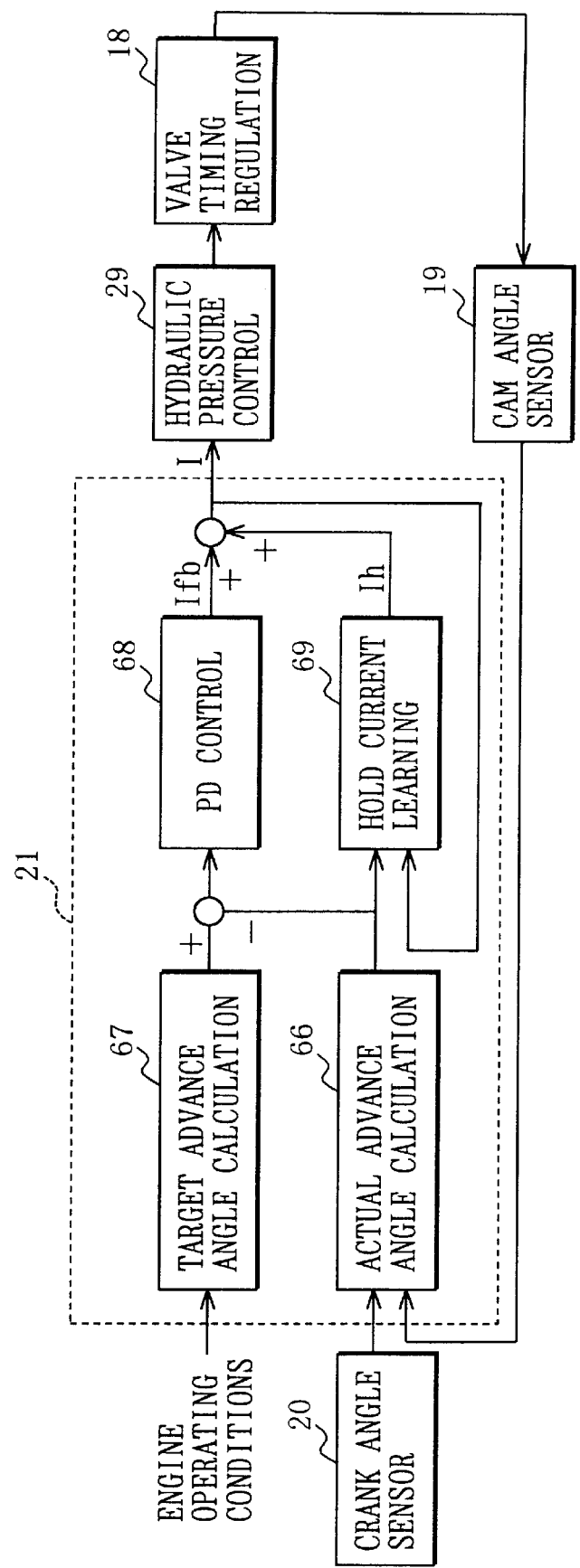
FIG. 8 is a control block diagram showing valve timing control in the first embodiment.
Figure 9:
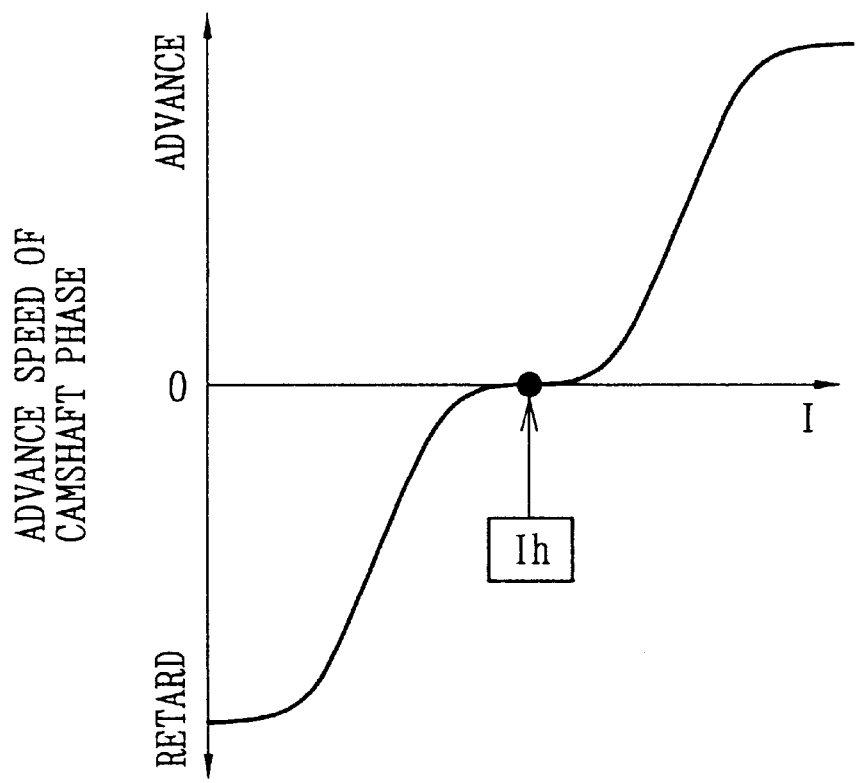
FIG. 9 is a graph showing characteristics of advance speed of a camshaft phase in the first embodiment.
Figure 10:
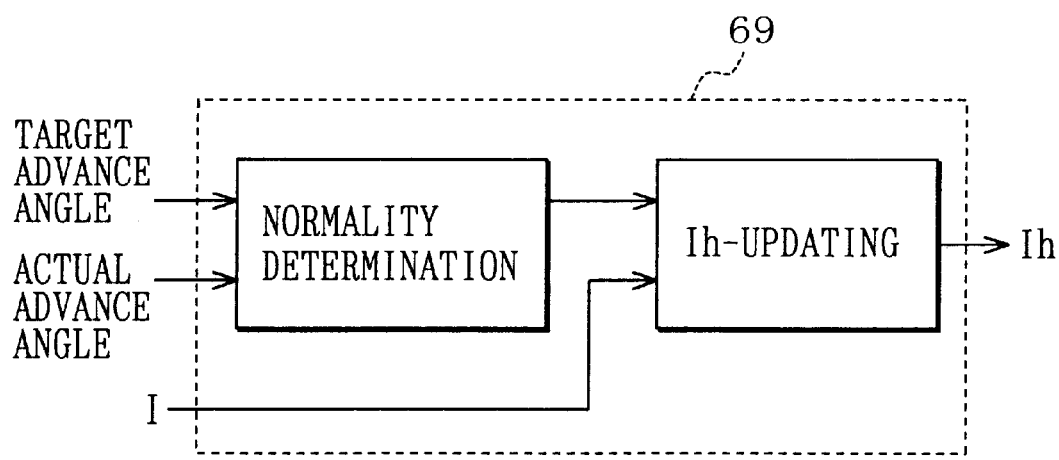
FIG. 10 is a block diagram showing a hold current learning method of a hold current learning section in the first embodiment.

As shown in FIGS. 3 and 4, a plurality of fluid chambers 40 are formed within the housing 31 and each fluid chamber 40 is parted as advancing angle chambers 42 and retarding angle chambers 43 by vanes 41 formed at the periphery of the rotor 35. Seal members 44 are attached to the periphery of the rotor 35 and to the periphery of the vane 41. The seal member 44 is urged in the peripheral direction by a leaf spring 45 (FIG. 2). Thereby, the gap between the outer peripheral plane of the rotor 35 and the inner peripheral plane of the housing 31 as well as the gap between the outer peripheral plane of the vane 41 and the fluid chamber 40 are sealed by the sealing member 44.

Ringed advancing and retarding grooves 46 and 47 formed at the periphery of the intake side camshaft 16 are connected to predetermined ports of the hydraulic pressure control valve 29, respectively, so that the oil pumped by the oil pump 28 from the oil pan 27 by the power of the engine 11 is supplied to the advancing groove 46 and the retarding groove 47 via the hydraulic pressure control valve 29. An advancing oil path 48 connected to the advancing groove 46 is formed so that it penetrates through the inside of the intake side camshaft 16 to communicate with an arc advancing oil path 49 (FIG. 3) formed at the left side of the rotor 35. The ark advancing oil path 49 communicates with the respective advancing chambers 42. Meanwhile, a retarding oil path 50 connected to the retarding groove 47 is formed so that it penetrates through the inside of the intake side camshaft 16 to communicate with an arc retarding oil path 51 (FIG. 4) formed at the right side of the rotor 35. The arc retarding oil path 51 communicates with the respective retarding chambers 43.

The hydraulic pressure control valve 29 is a four-port three-position change-over valve whose valve member is driven by a solenoid 53 and a spring 54 and which changes over the position of the valve among positions for supplying hydraulic pressure to the advancing chamber 42, for supplying hydraulic pressure to the retarding chamber 43 and for supplying no hydraulic pressure to any one of the advancing chamber 42 and the retarding chamber 43. When no power is fed to the solenoid 53, the valve is automatically switched to the position for supplying the hydraulic pressure to the advancing chamber 42 by the spring 54 so that the hydraulic pressure operates in the direction of advancing the camshaft phase.

The vane 41 is fixed by the hydraulic pressure of the advancing chamber 42 and the retarding chamber 43 when oil of predetermined pressure or more is supplied to the advancing chamber 42 and the retarding chamber 43. Then, the rotation of the housing 31 caused by the rotation of the crankshaft 12 is transmitted to the rotor 35 (vane 41) via the oil and the intake side camshaft 16 is rotated in a body with the rotor 35. During the engine is operated, the valve timing of the intake valve is varied by controlling the rotary phase of the intake side camshaft 16 with respect to the crankshaft 12 (camshaft phase) by relatively turning the housing 31 and the rotor 35 (vane 41) by controlling the hydraulic pressure of the advancing chamber 42 and the retarding chamber 43 by the hydraulic pressure control valve 29. It is noted that a torsion coil spring 55 (FIG. 2) which aids the hydraulic pressure for relatively turning the rotor 35 in the advancing direction during the advancing control by the force of spring is stored within the sprocket 14.

As shown in FIGS. 3 and 4, stopper sections 56 for restricting a relative turn range of the rotor 35 (vane 41) with respect to the housing 31 are formed at the both sides of either one vane 41 to restrict the most retarding phase and the most advancing phase of the camshaft phase. Further, a lock pin 58 (lock means) for locking the relative turn of the housing 31 and the rotor 35 (vane 41) is stored within a lock pin storage hole 57 formed in the other vane 41. The camshaft phase is locked almost at the intermediate position (intermediate lock phase) in the controllable range as the lock pin 58 fits into a lock hole 59 (FIG. 2) provided within the housing 31. This intermediate lock phase is set at the phase suitable for starting.

As shown in FIGS. 6 and 7, the lock pin 58 is slidably inserted into a cylindrical member 61 fitted into the inner periphery of the lock pin storage hole 57 and is urged in the lock direction (protruding direction) by a spring 62. The gap within the lock hole 59 is an unlocking chamber 60 which communicates with an unlocking groove 63 formed between the lock pin 58 and the cylindrical member 61. Then, a communication hole 65 for communicating the unlocking groove 63 with the retarding chamber 43 is formed through the vane 41 to supply hydraulic pressure to the unlocking chamber 60 from the retarding chamber 43 via the unlocking groove 63.

The lock pin 58 is held in the state in which it is fitted into the lock hole 59 by the spring 62 when the lock pin 58 is locked and the camshaft phase is held at the intermediate lock phase.

Because the hydraulic pressure of the unlocking chamber 60 (hydraulic pressure of the retarding chamber 43) and of the unlocking groove 63 drop during the engine is stopped, the lock pin 58 is held at the lock position by the spring 62. Accordingly, the engine is started at the state in which the lock pin 58 is held in the lock position (intermediate lock position). When the hydraulic pressure of the unlocking chamber 60 and the unlocking groove 63 rises after starting the engine, the lock pin 58 is unlocked by the hydraulic pressure as follows.

When the hydraulic pressure supplied from the retarding chamber 43 to the unlocking chamber 60 via the communication hole 65 and the unlocking groove 63 after starting the engine (force in the direction of releasing the lock) becomes greater than the force of the spring 62, the lock pin 58 is pushed out of the lock hole 59 by the hydraulic pressure of the unlocking chamber 60 and the unlocking groove 63 and is moved to the unlock position in FIG. 7, thus unlocking the lock pin 58.

Because the hydraulic pressure of the unlocking chamber 60 and the unlocking groove 63 is high when the engine is operative, the lock pin 58 is held at the unlock position by its hydraulic pressure. Thus, the state in which the housing 31 and the rotor 35 may turn relative to each other, i.e., the state in which valve timing control can be made, is held.

During the time the engine is operative, the engine control unit 21 functions also as valve timing control means. That is, it calculates an actual advancing angle (actual valve timing of the intake valve) of the intake side camshaft 16 based on the output signals of the crank angle sensor 20 and the cam angle sensor 19 by an actual advancing angle calculating section 66 and calculates a target advancing angle (target valve timing of the intake valve) of the intake side camshaft 16 based on the signals indicating the engine operating conditions such as engine speed, an intake amount and coolant temperature by a target advancing angle calculating section 67.

Then, it calculates feedback control current Ifb based on the deviation between the actual advancing angle and the target advancing angle and finds control current I (I=Ih+Ifb) by adding the feedback current Ifb to the hold current Ih learned by a hold current learning section 69 as described later to control the current of the hydraulic pressure control valve 29 and the solenoid 53 in feedback by this control current I. Thereby, it changes the camshaft phase by relatively turning the housing 31 and the rotor 35 by controlling the hydraulic pressure of the advancing chamber 42 and the retarding chamber 43 of the valve timing regulating unit 18 to cause the actual advancing angle of the intake side camshaft 16 to coincide with the target advancing angle.

Here, the hold current Ih is a control current for zeroing the advance speed of the camshaft phase (FIG. 9), i.e., control current of the hydraulic pressure control valve 29 for holding the camshaft phase at fixed position. The hold current learning section 69 described above determines whether or not it is normal (advance speed of the camshaft phase is zero) based on the actual advancing angle and the target advancing angle and outputs a normal signal when it is normal to update the control current I at that time as the hold current Ih. The hold current learning section 69 operates as hold current learning means.

Meanwhile, when the engine speed drops in stopping the engine 11, the hydraulic pressure of the advancing chamber 42 and the retarding chamber 43 drops because discharge pressure of the oil pump 28 drops. Thereby, when the hydraulic pressure of the unlocking chamber 60 (hydraulic pressure of the retarding chamber 43) drops and the force of the spring 62 exceeds the hydraulic pressure, the lock pin 58 protrudes by the force of the spring 62 and fits into the lock hole 59. However, the lock pin 58 fits into the lock hole 59 under the condition that the position of both phases coincides, i.e., the camshaft phase coincides with the intermediate lock phase.

Because the engine speed (number of revolutions of the oil pump 28) drops and the hydraulic pressure drops in stopping the engine 11, the camshaft phase changes naturally to the retarding side by load torque of the intake side camshaft 16. During this process, the lock pin 58 is fitted into the lock hole 59 and the camshaft phase is locked at the intermediate lock phase as shown in FIG. 6. It is noted that the hydraulic pressure control valve 29 may be controlled so as to advance the camshaft phase in stopping the engine 11 in order to reliably lock the camshaft phase at the intermediate lock phase.

Here, the engine is started in the state in which the lock pin 58 is held at the lock position (intermediate lock phase) and the lock pin 58 is unlocked by the hydraulic pressure of the unlocking chamber 60 (hydraulic pressure of the retarding chamber 43) or the hydraulic pressure of the unlocking groove 63 when their pressure increases. However, when it is arranged so that the hydraulic pressure is supplied to the unlocking chamber 60 (retarding chamber 43) or to the unlocking groove 63 in starting the engine, there is a possibility that the lock pin 58 is unlocked in starting the engine due to the increase of the hydraulic pressure caused by the increase of the engine speed (number of revolutions of the oil pump 28).

When the lock pin 58 is unlocked before completing the cranking, the camshaft phase deviates from the intermediate lock phase which is suitable for the start and the engine starts at inadequate valve timing. As a result, the startability is aggravated, the engine start time is prolonged or the engine operating condition after the start becomes unstable until when the hydraulic pressure increases.

Figure 11:
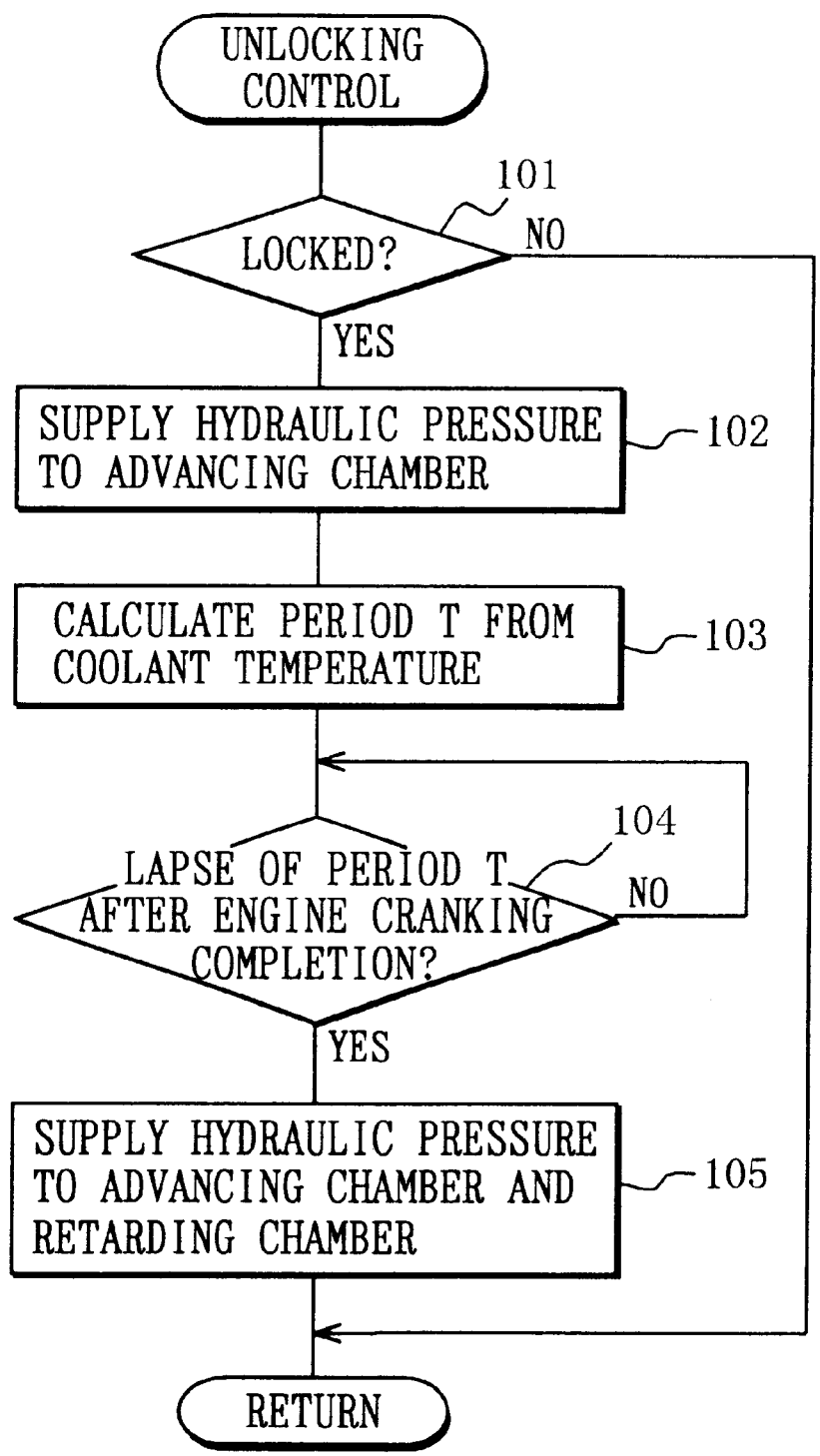
FIG. 11 is a flow chart showing processes of an unlock control program of the first embodiment.

Then, the engine control unit 21 executes an unlock control program shown in FIG. 11 to supply hydraulic pressure only to the advancing chamber 42 so that no hydraulic pressure is applied to the unlocking chamber 60 (the retarding chamber 43) and to the unlocking groove 63 to prevent the lock pin 58 from being unlocked in starting the engine. Then, after the completion of the crank, the lock pin 58 is unlocked by applying the unlocking hydraulic pressure to the unlocking chamber 60 and the unlocking groove 63 by controlling the hydraulic pressure control valve 29 so as to apply the hydraulic pressure to the both of the advancing chamber 42 and the retarding chamber 43.

The unlock control program in FIG. 11 is executed periodically after the ignition switch 25 is turned ON and operates as unlock control means. When this program is activated, it is determined whether or not the lock pin 58 is locked at step 101 at first. When it is already unlocked, this program ends without carrying out an unlocking process in and after step 102.

Meanwhile, when it is determined that the lock pin 58 is locked at step 101, the process advances to step 102 to set the control current I of the solenoid 53 of the hydraulic pressure control valve 29 to zero for example to control the valve to the position for supplying hydraulic pressure only to the advancing chamber 42 by the spring 54 of the hydraulic pressure control valve 29. Because no hydraulic pressure is supplied to the retarding chamber 43, no hydraulic pressure is applied to the unlocking chamber 60.

Then, the process advances to step 103 to retrieve a map data of period T using coolant temperature as a parameter to find a period T corresponding to the current coolant temperature. Here, the period T is set as a time which is slightly longer than a time necessary for putting into the condition by which the sufficient hydraulic pressure for controlling the camshaft phase may be supplied from the completion of cranking. The time necessary for putting into the condition by which the sufficient hydraulic pressure may be supplied changes corresponding to viscosity of oil (fluidity of oil) of the hydraulic circuit at that time and the viscosity of oil changes corresponding to oil temperature in general.

Accordingly, it is possible to adequately set the period T corresponding to changes of a time necessary for putting into the state by which the sufficient hydraulic pressure may be supplied depending on oil temperature by setting the period T by the map in which the coolant temperature which is substitute information of the oil temperature. It is noted that the period T may be found by using a map of the period T by using the oil temperature or engine temperature as the parameter instead of the coolant temperature. Still more, the period T may be found by using a functional equation instead of the map.

After calculating the period T, the process advances to step 104 to determine whether or not the period T has elapsed since the completion of cranking by a count value of a post-cranking counter (FIG. 12) for counting an elapse of time since the completion of cranking. When the period T has not elapsed, it is determined that the sufficient hydraulic pressure for controlling the camshaft phase has not supplied yet and the process waits at Step 104.

Then, when it is determined that the period T has elapsed since the completion of cranking at step 104, it is determined that the sufficient hydraulic pressure for controlling the camshaft phase may be supplied. The process then advances to step 105 to set the control current I of the solenoid 53 of the hydraulic pressure control valve 29 at the hold current Ih learned during the engine has been operative in the last time to supply hydraulic pressure to the both of the advancing chamber 42 and the retarding chamber 43. Thereby, the hydraulic pressure is supplied from the retarding chamber 43 to the unlocking chamber 60 and the unlocking groove 63. When the unlocking hydraulic pressure becomes greater than the force of the spring 62 of the lock pin 58, the lock pin 58 is pushed out of the lock hole 59 by the unlock hydraulic pressure and is unlocked.

Figure 12:
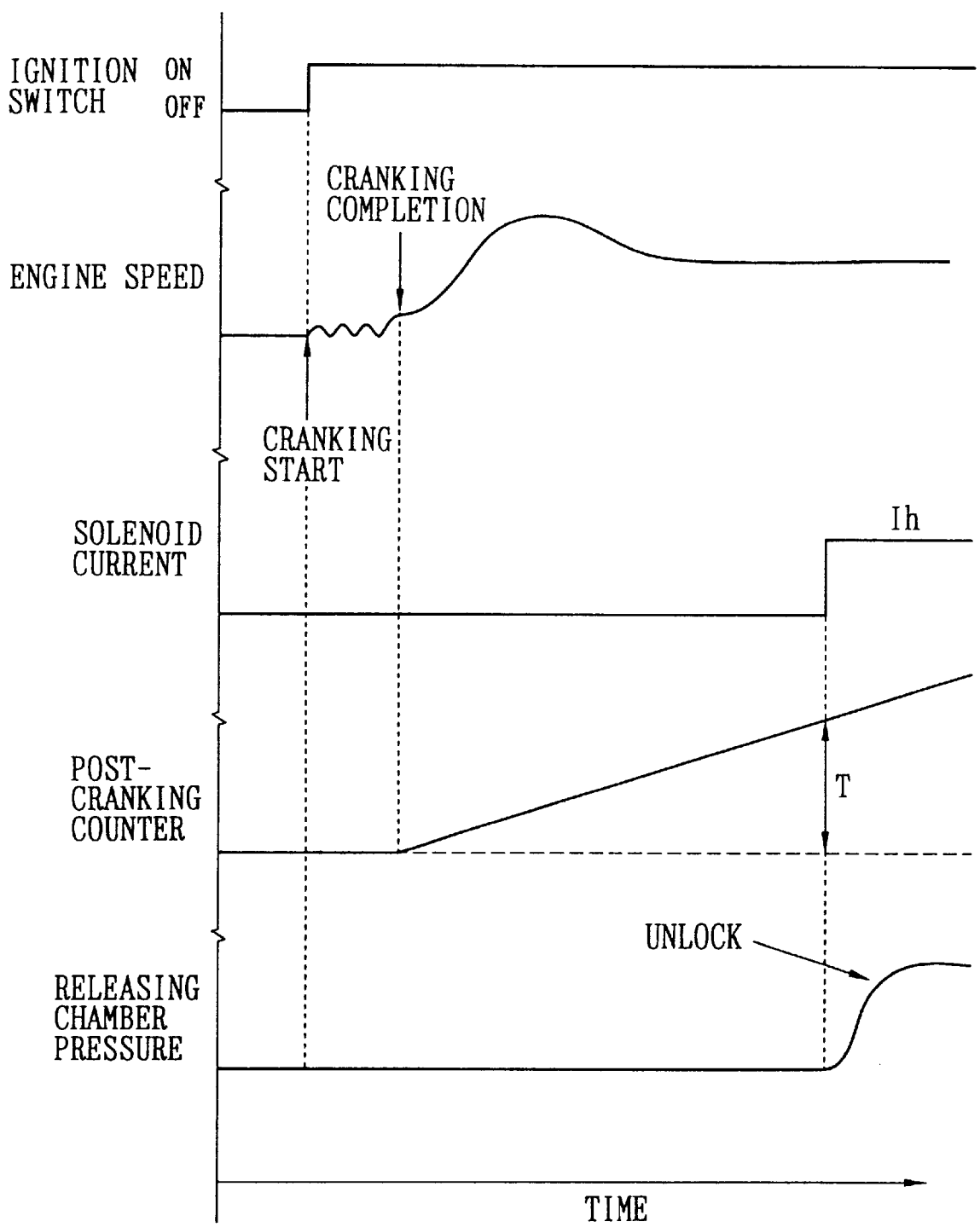
FIG. 12 is a time chart showing exemplary controls of the first embodiment.

An exemplary execution of the unlock control of the first embodiment described above will be explained by using a time chart in FIG. 12. When the engine 11 starts cranking as the ignition switch 25 is turned ON, although the oil pump 28 rotates and the hydraulic pressure starts to rise, no hydraulic pressure is applied to the unlocking chamber 60 (the retarding chamber 43) and to the unlocking groove 63 by controlling the control current of the solenoid 53 of the hydraulic pressure control valve 29 is controlled so as to supply the hydraulic pressure only to the advancing chamber 42. The control of applying no unlock hydraulic pressure to the unlocking chamber 60 and the unlocking groove 63 is continued until when the period T elapses since the completion of cranking.

The control current of the solenoid 53 of the hydraulic pressure control valve 29 is switched to the hold current Ih learned when the engine has been operative in the last time to supply the hydraulic pressure to the both of the advancing chamber 42 and the retarding chamber 43 at the point of time when the period T necessary for supplying the sufficient hydraulic pressure to control the camshaft phase elapses. Thereby, the hydraulic pressure is supplied from the retarding chamber 43 to the unlocking chamber 60 and the unlocking groove 63 and the lock pin 58 is unlocked.

According to the first embodiment described above, it is possible to reliably prevent the camshaft phase from being unlocked in cranking the engine and to avoid the problems of aggravation of startability, aggravation of engine controllability and noise which are otherwise caused by the careless unlock because the hydraulic pressure control valve 29 is controlled so as not supply the hydraulic pressure to the unlocking chamber 60 and the unlocking groove 63 in cranking the engine.

Further, it is possible to avoid the lock pin 58 from being unlocked before the camshaft phase may be controlled because the lock pin 58 is unlocked after the elapse of the period T by continuing the control of applying no unlock hydraulic pressure to the unlocking chamber 60 and the unlocking groove 63 until when the period T necessary for supplying the sufficient hydraulic pressure to control the camshaft phase since the completion of cranking by considering that a certain period of time is necessary to be able to supply the sufficient hydraulic pressure to control the camshaft phase even after the completion of cranking.

Still more, it is not necessary to provide a sensor for detecting oil temperature anew and the cost may be reduced because the period T is set corresponding to the coolant temperature which is substitute information of oil temperature by noticing on that the period T necessary to be able to supply the sufficient hydraulic pressure changes corresponding to the oil temperature (viscosity of the oil) at each time.

Further, the unlocking chamber 60 is communicated with the retarding chamber 43 to supply the hydraulic pressure from the retarding chamber 43 to the unlocking chamber 60 and the unlocking groove 63, the hydraulic pressure control valve 29 is controlled so as to supply the hydraulic pressure only to the advancing chamber 42 in cranking the engine and the hydraulic pressure control valve 29 is controlled so as to supply the hydraulic pressure to the both of the advancing chamber 42 and the retarding chamber 43 after the completion of cranking to unlock the lock pin 58, so that the structure of the passages for supplying the hydraulic pressure to the unlocking chamber 60 may be simplified and the control for releasing the lock may be carried out by using the hydraulic pressure control valve 29 for controlling the hydraulic pressure of the advancing chamber 42 and the retarding chamber 43 as it is. Thus, the structure of the control system may be simplified and the cost thereof may be lowered in total.

Further, because the control current of the solenoid 53 of the hydraulic pressure control valve 29 is controlled to the hold current Ih learned during the engine has been operative in the last time to unlock the camshaft phase while supplying the hydraulic pressure to the both of the advancing chamber 42 and the retarding chamber 43, the camshaft phase may be held around the intermediate lock phase from the moment when the lock is unlocked. It is also possible to prevent the camshaft phase from suddenly changing right after the unlock, to release the lock without hampering the stability of the engine operating condition and to control the valve timing (camshaft phase) at the target value right after the unlock.

It is noted that it is possible to set the control current of the hydraulic pressure control valve 29 in unlocking the lock pin 58 around the calculated hold current Ih by providing hold current calculating means for calculating the hold current Ih based on temperature information such as the oil temperature, coolant temperature and engine temperature instead of the function of learning the hold current Ih (the hold current learning section 69). That is, because the hold current Ih changes corresponding to the viscosity (fluidity) of the oil and the viscosity of oil changes corresponding to the oil temperature, the hold current Ih may be calculated based on the oil temperature or on the coolant temperature and engine temperature which are the substitute information of the oil temperature. Thus, almost the same effect of learning the hold current Ih may be also obtained by calculating the hold current Ih.

Second Embodiment

Figure 13:
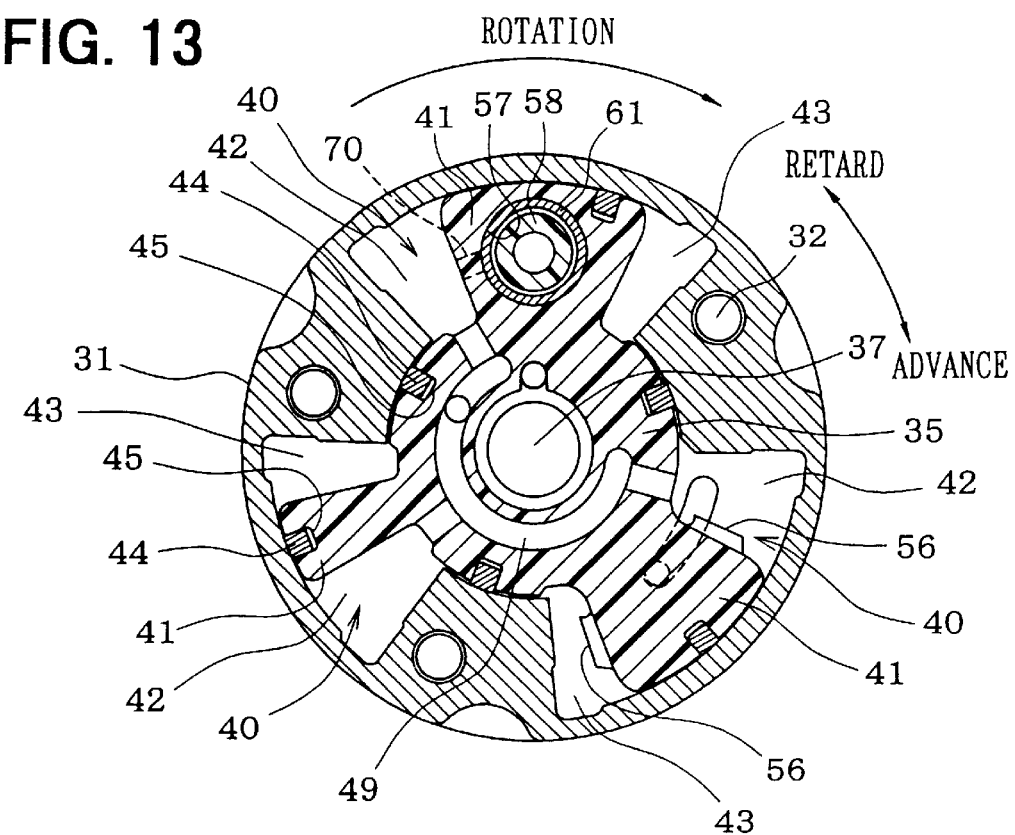
FIG. 13 is a sectional view of a valve timing regulating unit according to a second embodiment of the invention.
Figure 14:
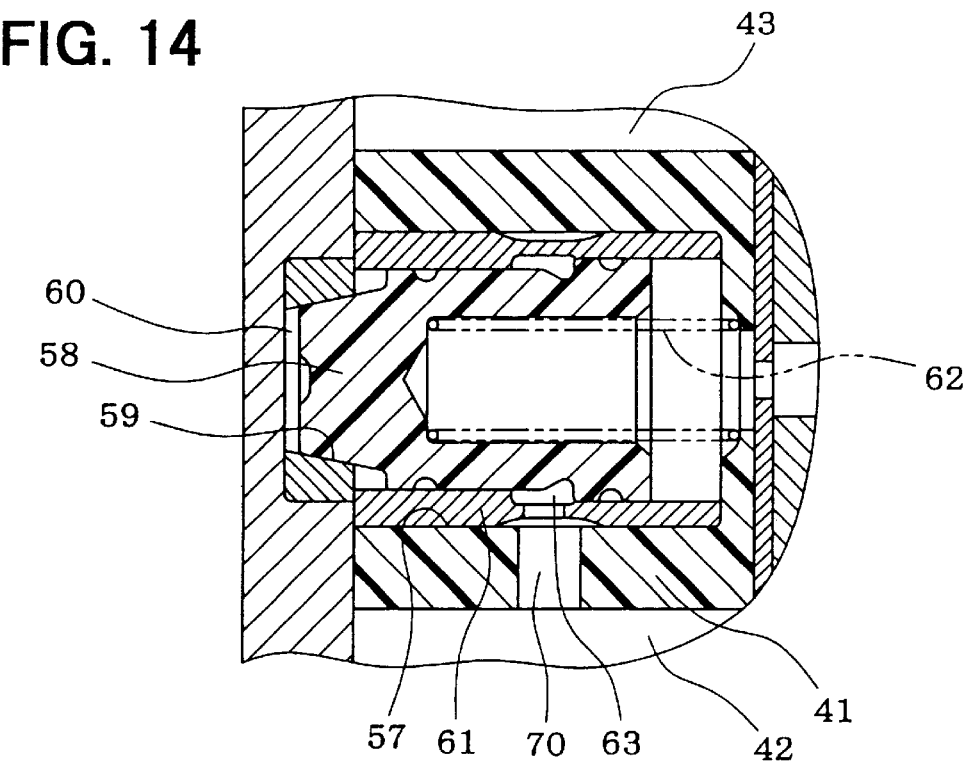
FIG. 14 is a partially enlarged sectional view showing the state in which a lock pin of the second embodiment is locked.

Next, a second embodiment of the invention will be described with reference to FIGS. 13 through 15. As shown in FIGS. 13 and 14, a communication hole 70 for communicating the unlocking groove 63 with the retarding chamber 43 is formed through the vane 41 to supply hydraulic pressure to the unlocking chamber 60 within the lock hole 59 from the advancing chamber 42 via the unlocking groove 63. A hydraulic pressure sensor (not shown) for detecting hydraulic pressure is also provided at the discharge side of the oil pump 28. It is noted that the hydraulic pressure may be estimated from the parameter of the engine operating condition such as the elapsed time from the start of cranking, coolant temperature (or oil temperature) and engine speed for example without providing the hydraulic pressure sensor. The other structure is the same with the first embodiment.

Figure 15:
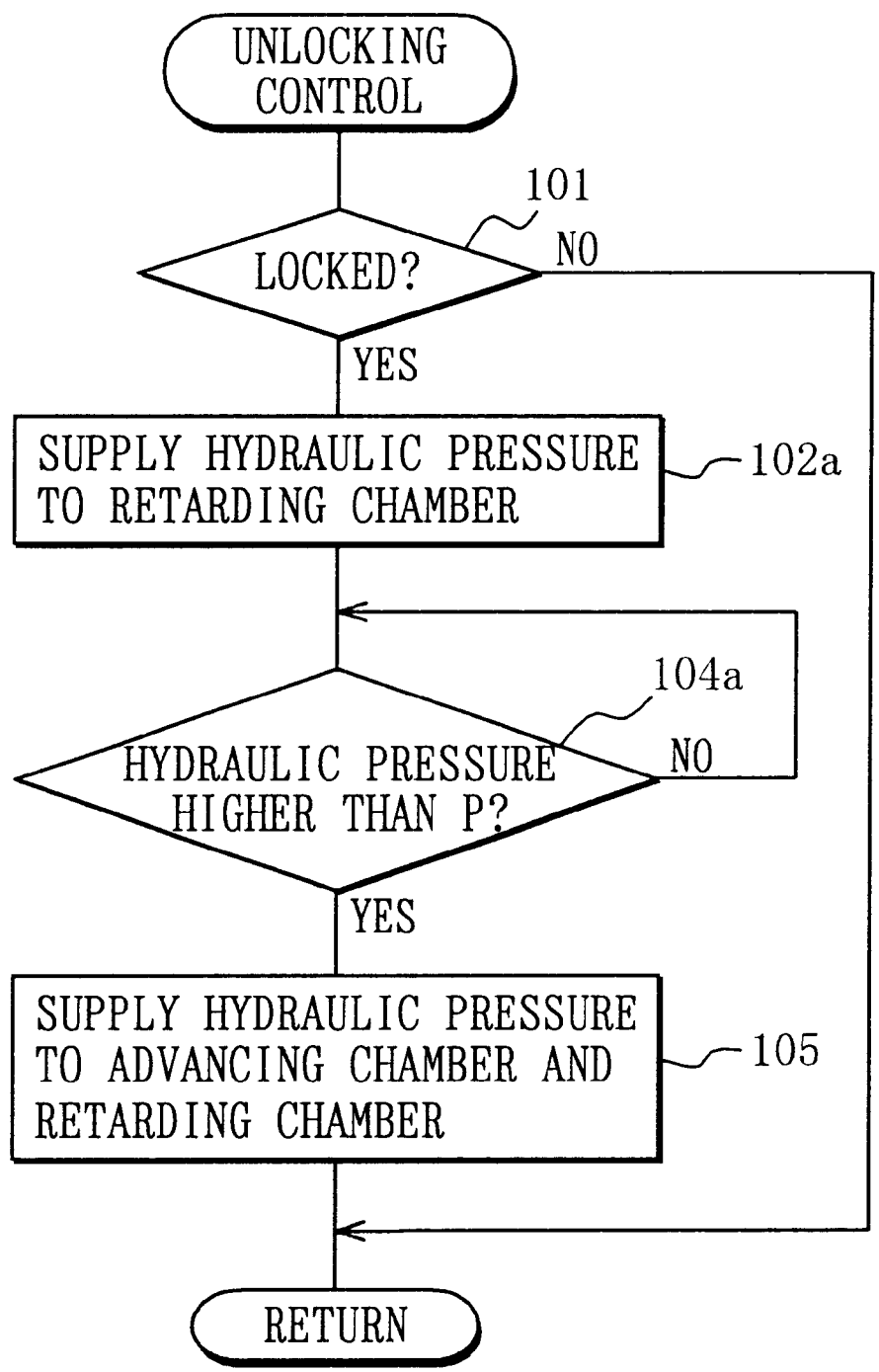
FIG. 15 is a flow chart showing processes of an unlock control program of the second embodiment.

An unlock control program shown in FIG. 15 and executed in the second embodiment is different from that of the first embodiment shown in FIG. 11 in that Step 102 in FIG. 11 is changed to a process at step 102*a* and Steps 103 and 104 are changed to a process at step 104*a*. The processes of the other Steps are the same as those in FIG. 11.

When it is determined that the lock pin 58 is locked at step 101 in this program, the process advances to step 102*a* to control the control current I of the solenoid 53 of the hydraulic pressure control valve 29 so as to supply hydraulic pressure only to the retarding chamber 43. Because no hydraulic pressure is supplied to the advancing chamber 42 at this time, no hydraulic pressure is applied to the unlocking chamber 60 and the unlocking groove 63.

Then, the process advances to step 104*a* to determine whether or not the hydraulic pressure discharged out of the oil pump 28 is greater than predetermined pressure P. Here, the predetermined pressure P is set at hydraulic pressure sufficient for controlling the camshaft phase. When the hydraulic pressure discharged out of the oil pump 28 is less than the predetermined pressure P, it is determined that sufficient hydraulic pressure for controlling the camshaft phase cannot be supplied and the process waits at Step 104*a*. It is then determined that the sufficient hydraulic pressure for controlling the camshaft phase may be supplied at the point of time when the hydraulic pressure discharged out of the oil pump 28 rises above the predetermined pressure P. Then, the control current I of the solenoid 53 of the hydraulic pressure control valve 29 is set at the hold current Ih to supply the hydraulic pressure to the both of the advancing chamber 42 and the retarding chamber 43 and the hydraulic pressure is supplied from the advancing chamber 42 to the unlocking chamber 60 and the unlocking groove 63 to unlock the lock pin 58 at step 105.

Because the control is made so as to supply no hydraulic pressure to the unlocking chamber 60 and the unlocking groove 63 in cranking the engine also in the second embodiment described above, it is possible to reliably prevent the camshaft phase from being unlocked carelessly in cranking the engine and to avoid the problems of aggravation of startability, aggravation of engine controllability and noise which are otherwise caused by the careless release of the lock.

Still more, because the hydraulic pressure is supplied to the unlocking chamber 60 and the unlocking groove 63 after the hydraulic pressure discharged out of the oil pump 28 rises above the predetermined pressure P, the lock pin 58 may be unlocked and the valve timing control may be started after the hydraulic pressure rises to pressure sufficient for actually controlling the camshaft phase.

It is noted that although the hydraulic pressure is supplied to the unlocking chamber 60 and the unlocking groove 63 after the hydraulic pressure discharged out of the oil pump 28 rises above the predetermined pressure P, the hydraulic pressure may be supplied to the unlocking chamber 60 after the period T elapses since the completion of cranking.

Third Embodiment

Figure 16:
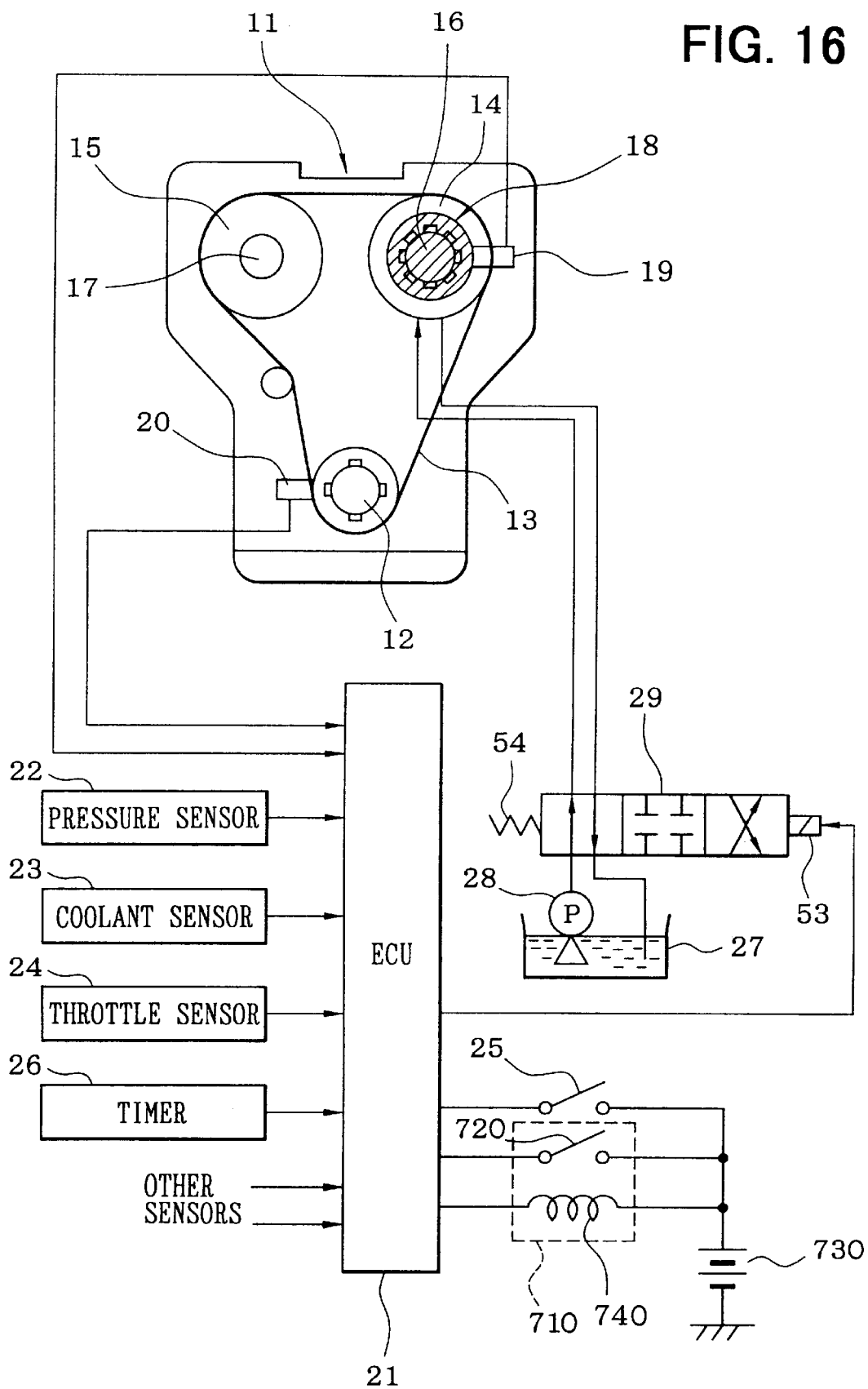
FIG. 16 is a schematic structural view of the whole control system according to a third embodiment of the invention.
Figure 17:
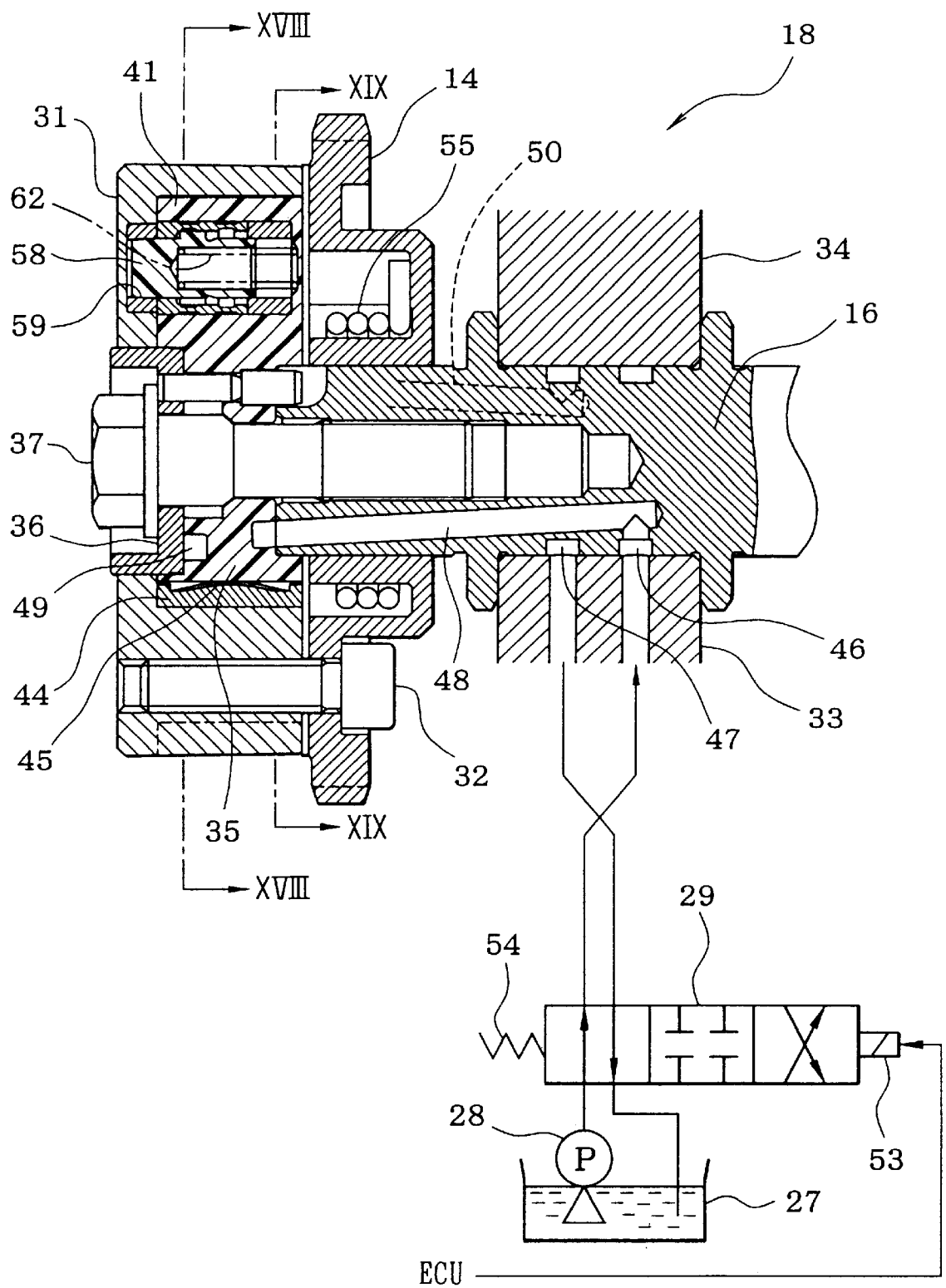
FIG. 17 is a longitudinal sectional view of a valve timing regulating unit of the third embodiment.
Figure 18:
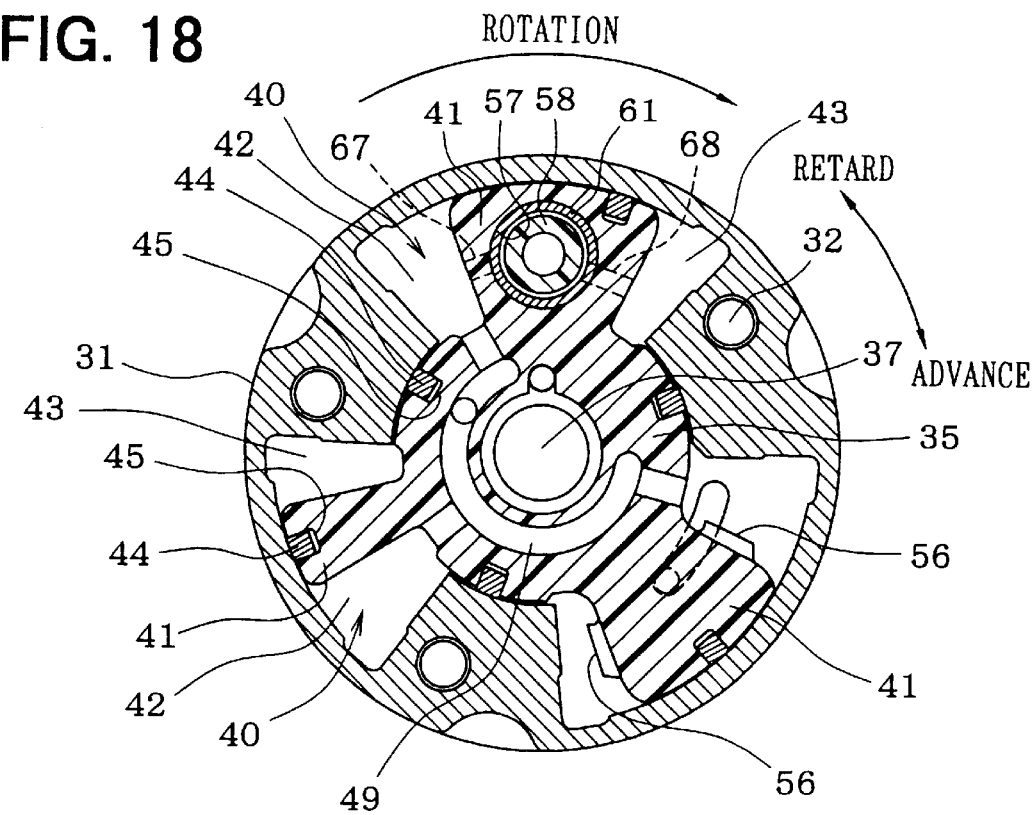
FIG. 18 is a sectional view taken along a line XVIII—XVIII in FIG. 17.
Figure 19:
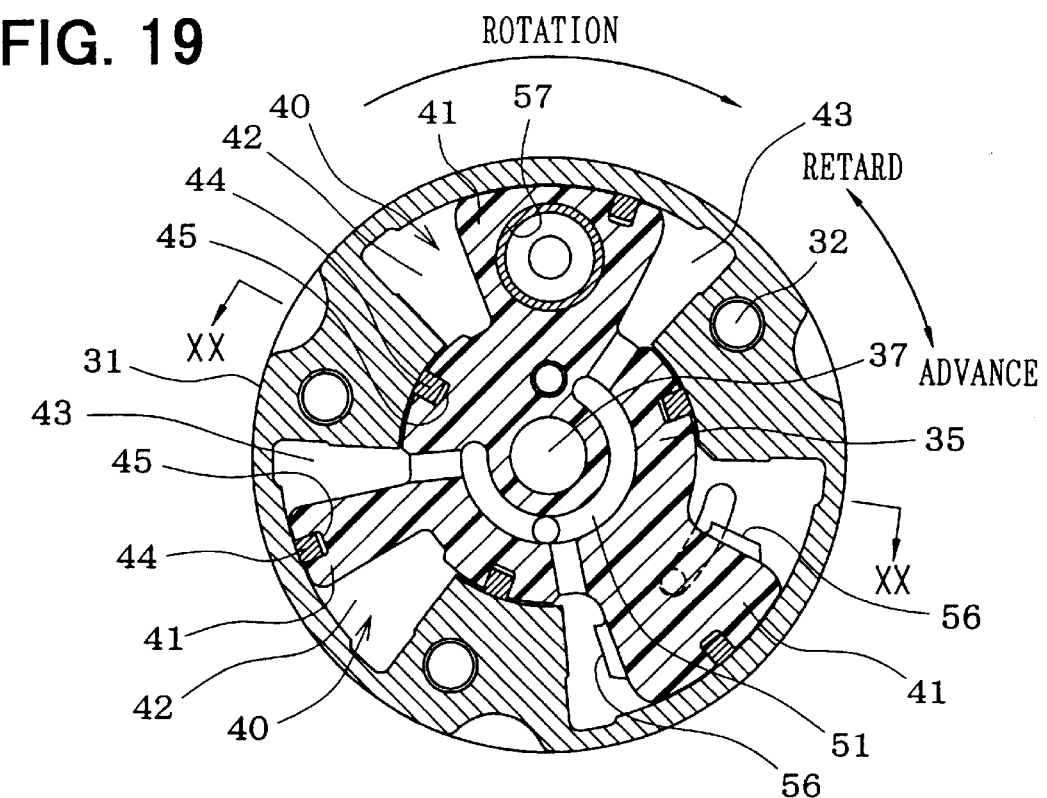
FIG. 19 is a sectional view taken along a line XIX—XIX in FIG. 17.
Figure 20:
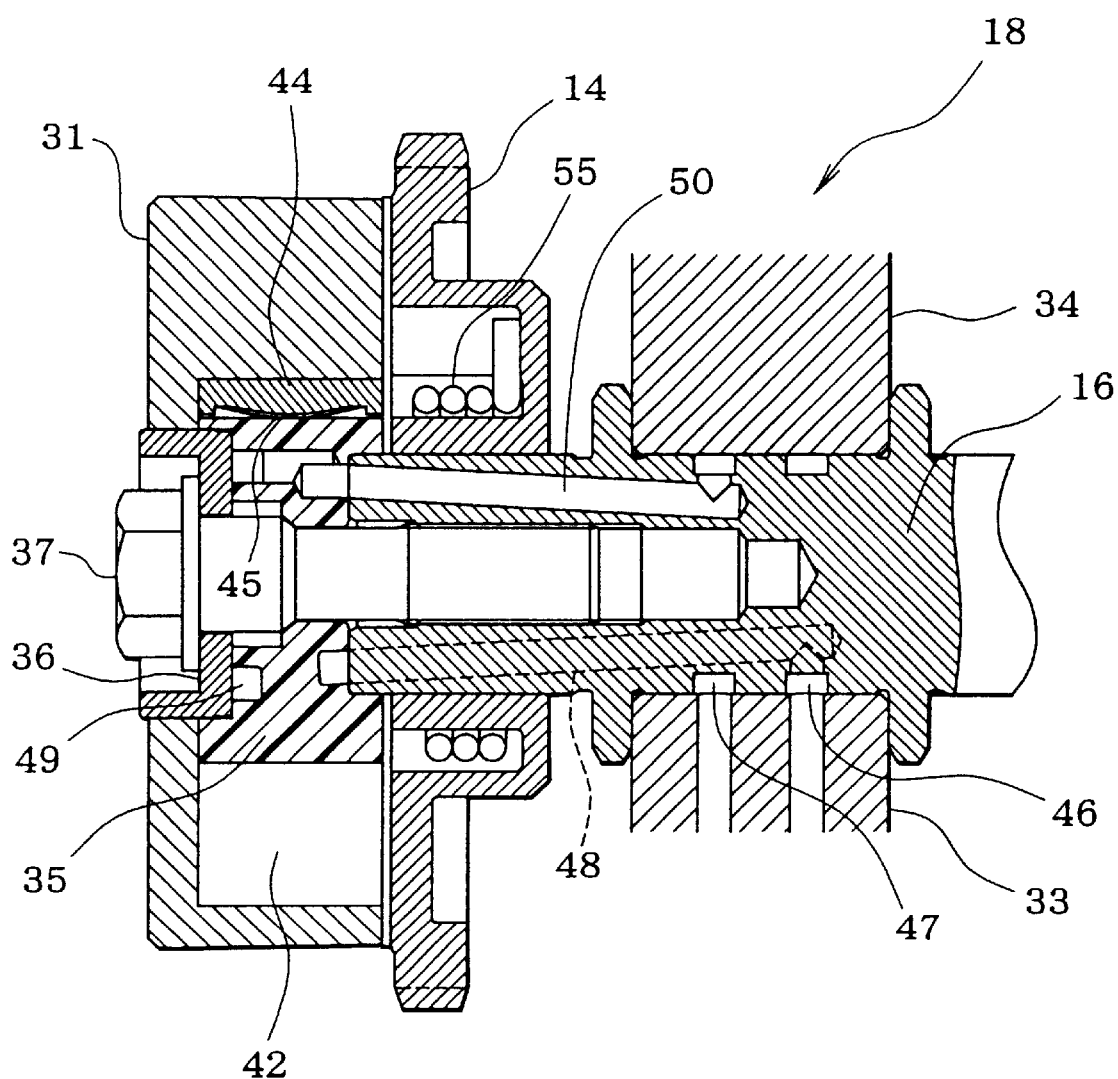
FIG. 20 is a sectional view taken along a line XX—XX in FIG. 19.

As shown in FIG. 16, a plus terminal of a battery 730 is connected to a power terminal of the engine control unit 21 via a switch 720 of a main relay 710. When an ON signal is inputted from the ignition switch 25, the engine control unit 21 feeds power to a relay drive coil 740 of the main relay 710 to turn on the switch 720 of the main relay 710 to receive the supply of power from the battery 730. The power supplied via the main relay 710 is supplied to the whole control system such as the hydraulic pressure control valve 29 beside the engine control unit 21. The main relay 710 is held in the ON state for a predetermined time continuously even after the ignition switch 25 is turned off to be able to execute lock advancing control described later during that period.

The valve timing unit is constructed almost in the same manner with the first embodiment as shown in FIGS. 17 through 20.

Figure 21:
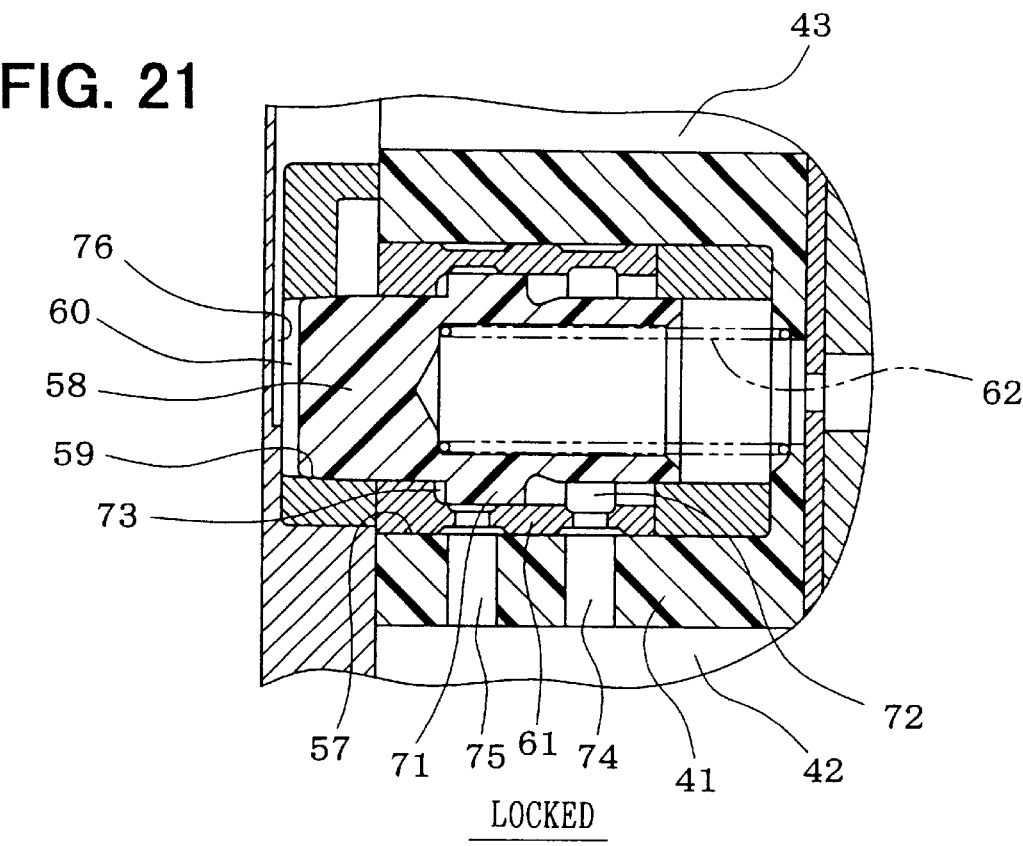
FIG. 21 is a partially enlarged sectional view showing the state in which a lock pin of the third embodiment is locked.
Figure 22:
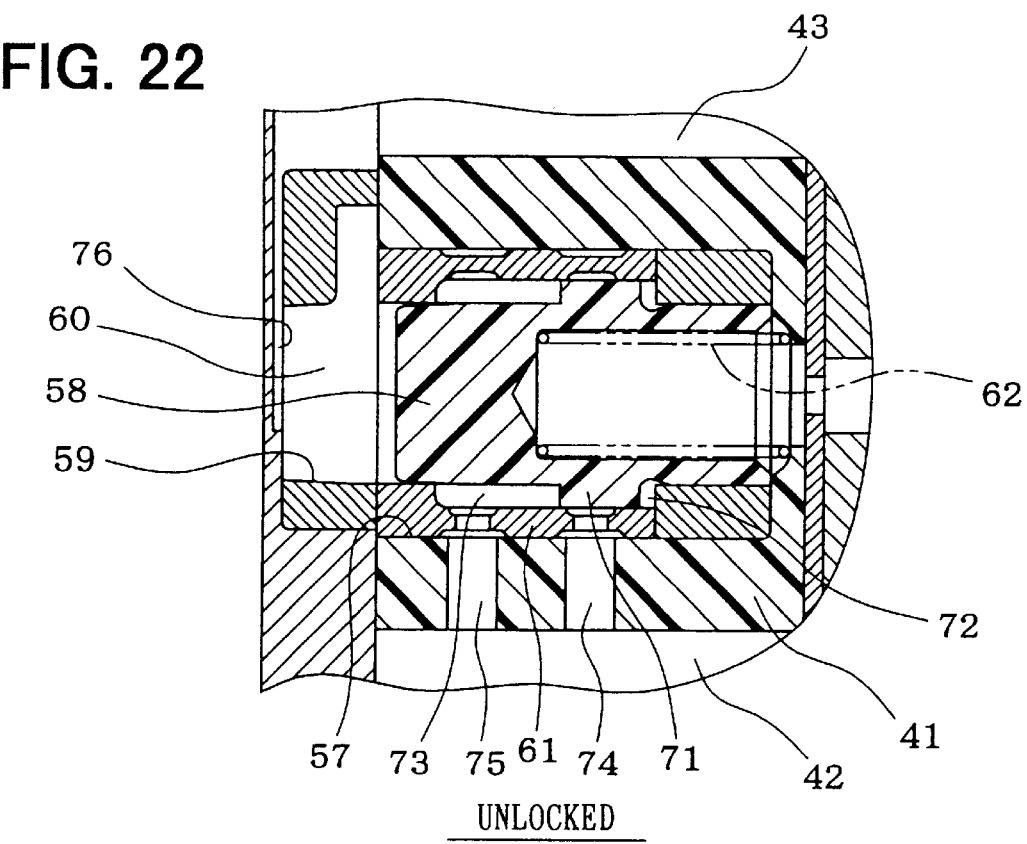
FIG. 22 is a partially enlarged sectional view showing the state in which the lock pin of the third embodiment is unlocked.

According to the third embodiment, the gap between the cylindrical member 61 and the lock pin 58 is parted into a locking hydraulic chamber 72 and an unlock holding hydraulic chamber 73 by a main relay 71 formed at the peripheral part of the center of the lock pin 58 as shown in FIGS. 21 and 22. Then, a locking oil path 74 and an unlock holding oil path 75 which communicate to the advancing chamber 42 are formed through the vane 41 to supply hydraulic pressure from the advancing chamber 42 to the locking hydraulic chamber 72 and the unlock holding hydraulic chamber 73. An unlocking oil path 76 which communicates the unlocking chamber 60 with the retarding chamber 43 is formed through the housing 31.

The lock pin 58 is held at the lock position by the spring 62 during the engine is stopped as shown in FIG. 21. The engine is cranked in the state in which the lock pin 58 is held at the lock position and the hydraulic pressure is supplied only to the advancing chamber 42 at first. When the lock pin 58 is locked, the main relay 710 of the lock pin 58 clogs the unlock holding oil path 75 and the locking oil path 74 is communicated with the locking hydraulic chamber 72. Therefore, the hydraulic pressure is supplied from the advancing chamber 42 to the locking hydraulic chamber 72. Then, the lock pin 58 is held while being fitted into the lock hole 59 and the camshaft phase is held at the intermediate lock phase by the hydraulic pressure and the spring 62.

When the hydraulic pressure is supplied to the both advancing and retarding chambers 42 and 43 after completing the cranking of the engine, the lock pin 58 is unlocked by its hydraulic pressure as follows. That is, when the force in the unlocking direction generated by the hydraulic pressure supplied to the unlocking chamber 60 from the retarding chamber 43 via the unlock oil path 76 becomes greater than the force in the lock direction generated by the hydraulic pressure of the locking hydraulic chamber 72 and the spring 62, the lock pin 58 is pushed out of the lock hole 59 and moves to the unlocking position in FIG. 18, thus unlocking the lock pin 58.

In this unlocking state, the main relay 710 of the lock pin 58 closes the locking oil path 74 and the unlock holding oil path 75 is communicated with the unlock holding hydraulic chamber 73. Thereby, the hydraulic pressure is supplied from the advancing chamber 42 to the unlock holding hydraulic chamber 73 and the lock pin 58 is held at the unlocking position against the spring 62 by the hydraulic pressure of the unlock holding hydraulic chamber 73 (the hydraulic pressure of the advancing chamber 42) and the hydraulic pressure of the unlocking chamber 60 (the hydraulic pressure of the retarding chamber 43).

Because the hydraulic pressure of either the advancing chamber 42 or the retarding chamber 43 is high during the engine is operative, the lock pin 58 is held at the unlocking position by that hydraulic pressure and the housing 31 and the rotor 35 are held in the state in which they can turn relatively, i.e., in the state in which the valve timing control can be made.

When the hydraulic pressure of the advancing chamber 42 and the retarding chamber 43 drops due to the drop of the engine speed (due to the drop of discharge pressure of the oil pump 28) when the engine 11 is stopped, the hydraulic pressure of the unlock holding hydraulic chamber 73 (the hydraulic pressure of the advancing chamber 42) and the hydraulic pressure of the unlocking chamber 60 (the hydraulic pressure of the retarding chamber 43) drop. Then, when the force of the spring 62 exceeds those hydraulic pressures, the lock pin 58 protrudes by the force of the spring 62 and fits into the lock hole 59.

According to the third embodiment, the engine control unit 21 executes the unlock control program in FIG. 11 similarly to the first embodiment to supply the hydraulic pressure only to the advancing chamber 42 so that no hydraulic pressure is applied to the unlocking chamber 60 (the retarding chamber 43) to prevent the lock pin 58 from being unlocked in cranking the engine. Then, when the predetermined unlock executing conditions are fulfilled after completing the cranking, the hydraulic pressure control valve 29 is controlled so as to apply the hydraulic pressure to the both of the advancing chamber 42 and the retarding chamber 43 to apply the unlock hydraulic pressure to the unlocking chamber 60 to unlock the lock pin 58. Here, the unlock executing conditions include such conditions that the period has elapsed from the cranking or the hydraulic pressure discharged out of the oil pump 28 has risen to a predetermined value or more.

According to the third embodiment, the hydraulic pressure of the retarding chamber 43 is actuated in the locking direction of the lock pin 58 when the lock pin 58 is located at the lock position and the hydraulic pressure of the retarding chamber 43 is actuated in the unlocking direction when the lock pin 58 is located at the unlocking position, so that the unlock preventing effect in cranking the engine may be enhanced further and the lock pin 58 may be held stably at the unlocking position after completing the cranking.

It is noted that it is possible to construct such that the unlocking chamber 60 communicates with the advancing chamber 42 and the locking hydraulic chamber 72 and the unlock holding hydraulic chamber 73 communicate with the retarding chamber 43 in the opposite way from the third embodiment. In this case, the hydraulic pressure is supplied only to the retarding chamber 43 in cranking the engine and the hydraulic pressure control valve 29 is controlled so as to apply the hydraulic pressure to the both of the advancing chamber 42 and the retarding chamber 43 after completing the cranking.

Figure 23:
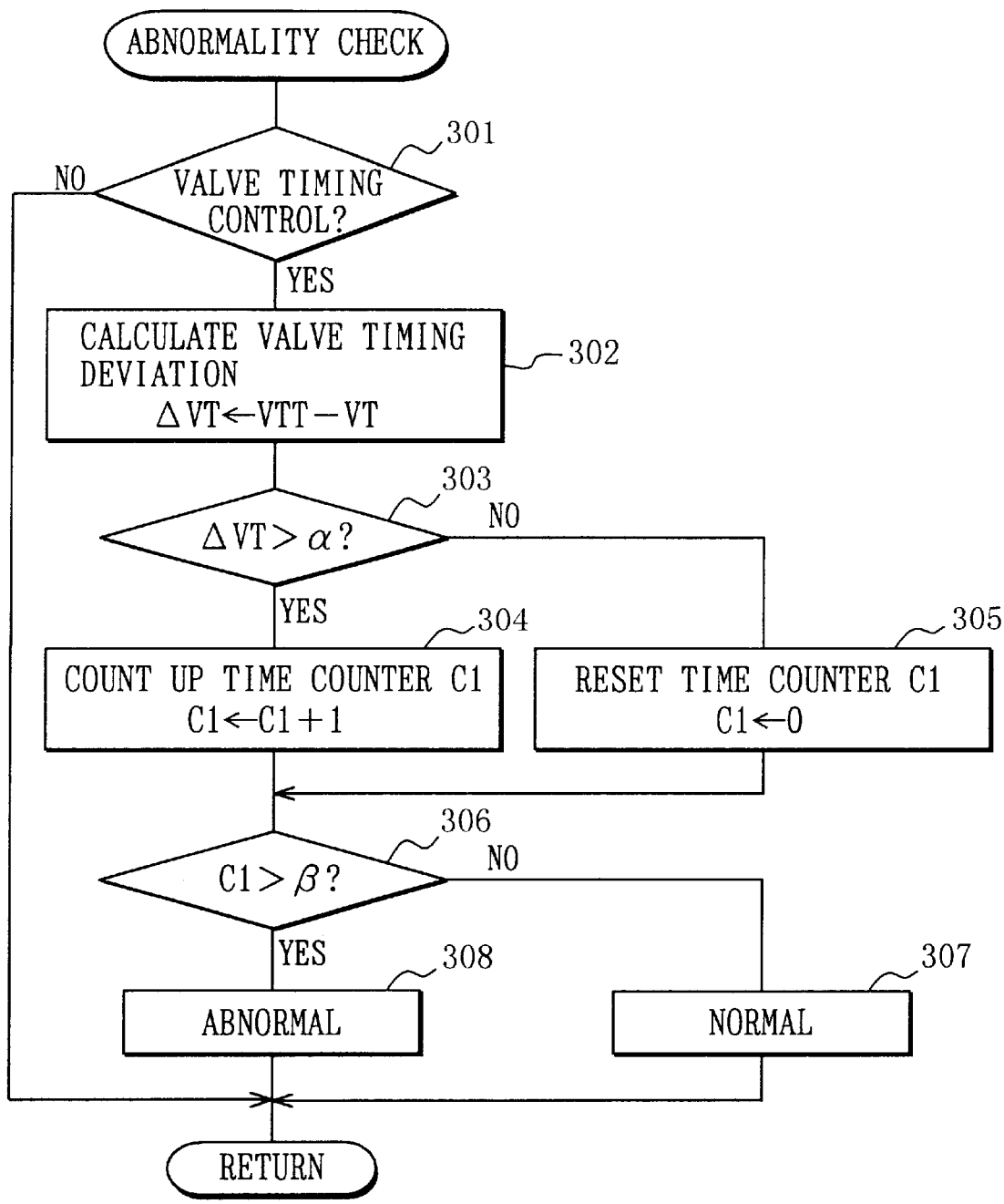
FIG. 23 is a flow chart showing processes of an abnormality determining program of the third embodiment.
Figure 24:
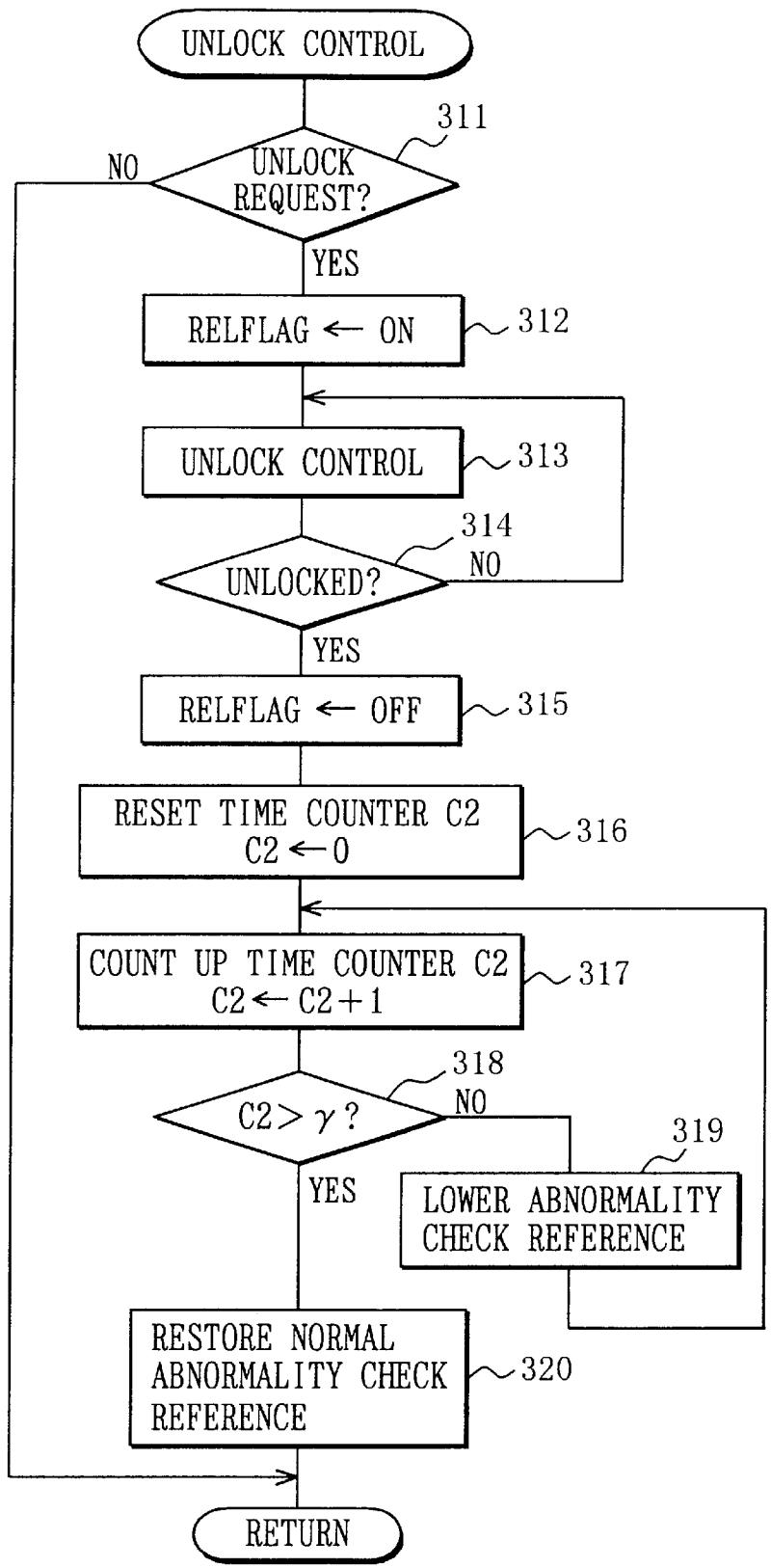
FIG. 24 is a flow chart showing processes of an unlock control program of the third embodiment.

According to the third embodiment, the engine control unit 21 also executes an abnormality check program in FIG. 23 and an unlock control program in FIG. 24. The contents of processes of these programs will be explained below.

The abnormality checking program shown FIG. 23 is repeatedly executed at predetermined period and functions as abnormality checking means for checking whether or not there exists an abnormality of the valve timing control system. It is checked at first whether or not the valve timing control is being made now at step 201. When the valve timing control is not made (when the lock pin 58 is locked), the program ends without carrying out the abnormality checking process thereafter.

When the valve timing control is being made on the other hand, the process advances to step 202 to calculate the deviation of valve timing between the target valve timing VTT and the actual valve timing VT by the following expression:

$$\Delta VT = VTT - VT$$

Then, the deviation $\Delta VT$ of the valve timing is compared with an abnormality checking value a at step 203. An abnormality may exist when the deviation $\Delta VT$ of the valve timing is greater than the abnormality checking value $\alpha$, so that a time counter for counting continuous time C1 of the abnormal state is counted. When the deviation $\Delta VT$ of the valve timing is below the abnormality checking value $\alpha$, it is determined that the operation is normal and the value of the time counter C1 is reset.

Then, it is determined whether or not the continuous time C1 of the abnormal state counted by the time counter has exceeded a period $\beta$. When the continuous time C1 of the abnormal state has exceeded the period $\beta$, it is determined that the valve timing control system is abnormal at step 208. When the continuous time C1 of the abnormal state is the period $\beta$ or less, the valve timing control system is determined to be abnormal at step 207.

In short, abnormality is determined when the state in which the deviation $\Delta VT$ of the valve timing is greater than the abnormality checking value $\alpha$ for the period $\beta$ or more and normality is determined otherwise. It is noted that the abnormality checking method is not limited to the method described above. That is, it is possible to set the abnormality checking value $\alpha$ at a large value more or less and to determine abnormality immediately when the deviation $\Delta VT$ of the valve timing exceeds the abnormality checking value $\alpha$.

Here, because the hydraulic pressure of the both of the advancing chamber 42 and the retarding chamber 43 acts in the unlocking direction during the valve timing control, there is a case when the lock pin 58 is unlocked when the hydraulic pressure of either one of the advancing chamber 42 and the retarding chamber 43 becomes high at first, even though the hydraulic pressure of the other one is low, due to the rise of the hydraulic pressure caused by the increase of the engine speed (number of revolutions of the oil pump 28) after cranking the engine. The camshaft phase changes suddenly to the side where the hydraulic pressure is low at the moment of unlock and the actual valve timing VT deviates largely from the target valve timing VTT because the hydraulic pressure of the other one is low even when the lock is unlocked in this state. In such a case, there is a possibility that the transient increase of the deviation ΔVT of the actual valve timing VT right after the unlock described above is erroneously determined to be abnormal because it takes for a while until when the hydraulic pressure of the both of the advancing chamber 42 and the retarding chamber 43 rises fully after the unlock and the valve timing control can be made normally.

Then, the engine control unit 21 relaxes or lowers the abnormality checking condition when the lock pin 58 is unlocked by executing the unlock control program in FIG. 24 to prevent the transient increase of the ΔVT of the actual valve timing VT right after the unlock from being erroneously determined to be abnormal.

The unlock control program in FIG. 24 which controls as described above is executed repeatedly at predetermined period. When this program is activated, it is determined whether or not an unlock request has been made based on a signal of a starter switch and the engine speed at step 311. For instance, it is determined that the unlock request exists when the engine speed rises above a predetermined speed after cranking the engine. When there is no unlock request, this program ends without carrying out the processes thereafter there is an unlock request, the process advances to step 312 to switch an unlock request flag Relflag ON. Then, the unlock control is executed at step 314 to unlock the lock pin 58. The lock pin 58 is unlocked by pushing it out of the lock hole 59 by hydraulic pressure applied uniformly to the both of the advancing chamber 42 and the retarding chamber 43 by flowing the hold current for holding the camshaft phase at the intermediate lock phase to the solenoid 53 of the hydraulic pressure control valve 29 under this unlock control.

It is then checked whether or not the unlock of the lock pin 58 is detected at step 314. The unlock control is repeated until when the unlock is detected. Thereafter, the process advances to step 315 at the point of time when the unlock is detected and the unlock request flag Relflag is switched to "OFF" meaning that there is no unlock request. After that, the time counter for counting an elapsed time C2 after detecting the unlock is reset at step 316 and the value C2 of this time counter is counted (Step 207) to measure the elapsed time C2 after detecting the unlock.

Then, whether or not the elapsed time C2 which is measured from when the unlocked state is detected has exceeded a period γ is determined at step 318. Here, the period γ g represents a period for relaxing the abnormality checking condition after unlocking the lock. Although the period γ may be a fixed value set in advance, it may be set by a map or a numerical expression using temperature information such as oil temperature, coolant temperature or engine temperature as a parameter. Thus, the period for returning the abnormality checking condition or determination standard to the normal value may be adequately set according to the time when the control of the camshaft phase is stabilized which depends on the oil temperature (viscosity of oil).

Then, in order to avoid the transient increase of the deviation ΔVT of the actual valve timing VT right after the unlock from being erroneously determined as abnormal until when the elapsed time C2 after detecting the unlock exceeds the period γ, the both or the either one of the abnormality checking value α and the period β among the abnormality checking condition used in the abnormality checking program in FIG. 23 is relaxed at step 319. For instance, the abnormality checking value a is increased or the period β is prolonged.

The process advances to step 320 at the point of time when the elapsed time C2 after detecting the unlock exceeds the period γ to return the abnormality checking condition to the normal value. It is noted that the processes at steps 314 through 320 operate as abnormality checking condition relaxing means.

Figure 25:
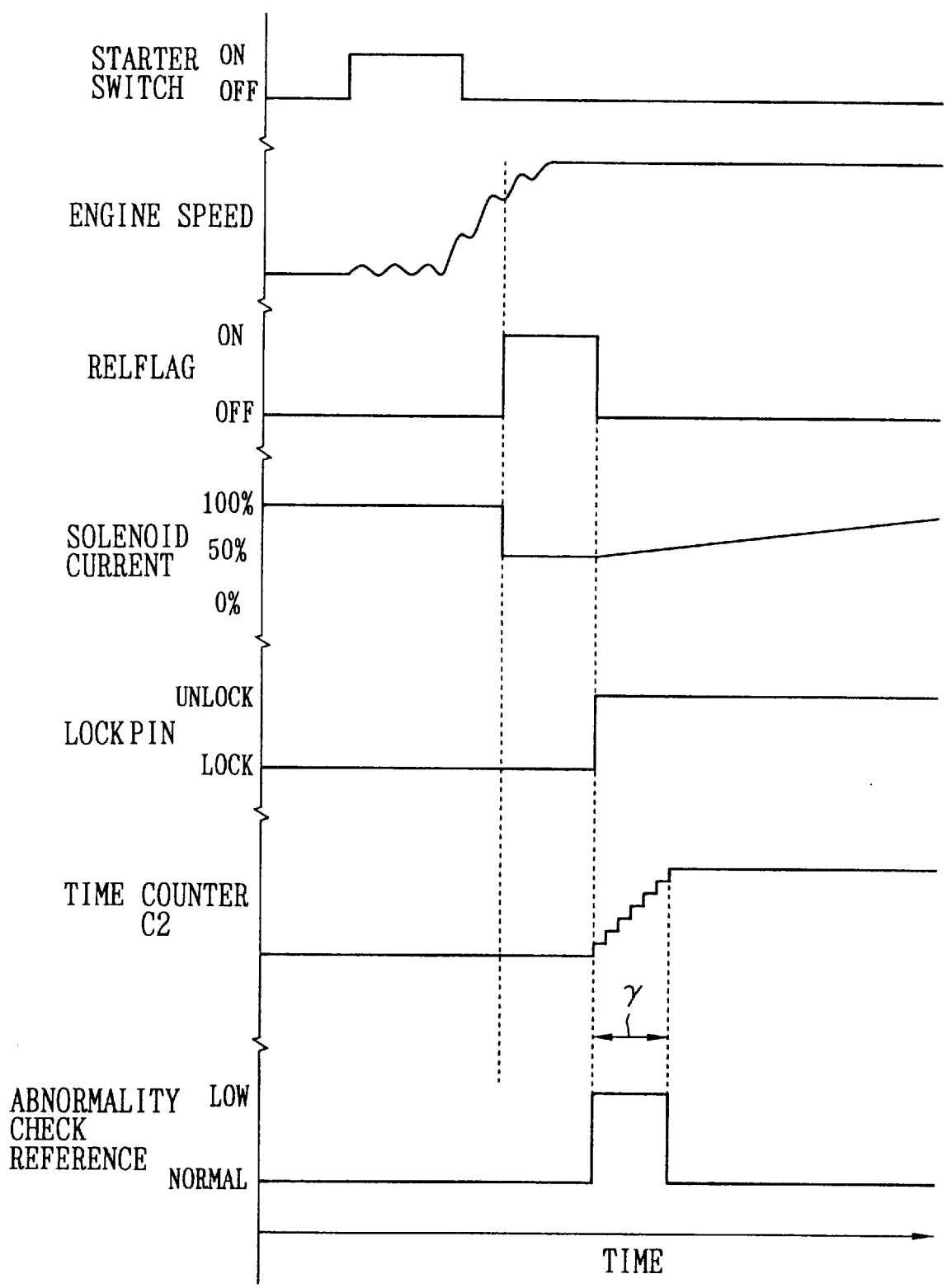
FIG. 25 is a time chart showing exemplary controls of the third embodiment.

An exemplary control made when the unlock control program in FIG. 24 described above is executed will be explained below by using a time chart in FIG. 25. When it is determined that the engine speed rises above a predetermined speed after cranking the engine based on the signal of the starter switch and the engine speed, the unlock request flag Relflag is switched to "ON". Thereby, the unlock control is started and the lock pin 58 is unlocked by pushing out the lock pin 58 out of the lock hole 59 by hydraulic pressure applied uniformly to the both of the advancing chamber 42 and the retarding chamber 43 by flowing the hold current for holding the camshaft phase at the intermediate lock phase to the solenoid 53 of the hydraulic pressure control valve 29.

Then, the elapsed time C2 after detecting the unlock is counted by the time counter at the point of time when the unlock is detected and the abnormality checking condition is relaxed until when the elapsed time C2 after detecting the unlock exceeds the period γ. After that, the abnormality checking condition is returned to the normal value at the point of time when the elapsed time C2 after detecting the unlock exceeds the period γ.

It is possible to prevent the transient increase of the deviation ΔVT of the actual valve timing VT right after the unlock from being determined as abnormal by relaxing the abnormality checking condition until when the elapsed time C2 after detecting the unlock exceeds the period γ. Still more, because the abnormality checking process may be continued under the relaxed abnormality checking condition even right after the unlock, it is possible to detect an abnormality quickly when it has actually occurred. That is, it is possible to achieve the both functions of quickly detecting the abnormality and of preventing the erroneous detection.

Because the engine speed (number of revolutions of the oil pump 28) drops and the hydraulic pressure drops in stopping the engine 11, the camshaft phase changes naturally to the retarding side by the load torque of the intake side camshaft 16. Then, it is necessary to lock the camshaft phase at the intermediate lock phase by fitting the lock pin 58 into the lock hole 59 in that process as shown in FIG. 21. However, when the camshaft phase is located already at the retarding side by exceeding the intermediate lock phase in stopping the engine 11, the lock pin 58 does not reach to the lock hole 59 and the camshaft phase cannot be locked at the intermediate lock phase even when the camshaft phase changes to the retarding side due to the drop of the hydraulic pressure.

Figure 26:
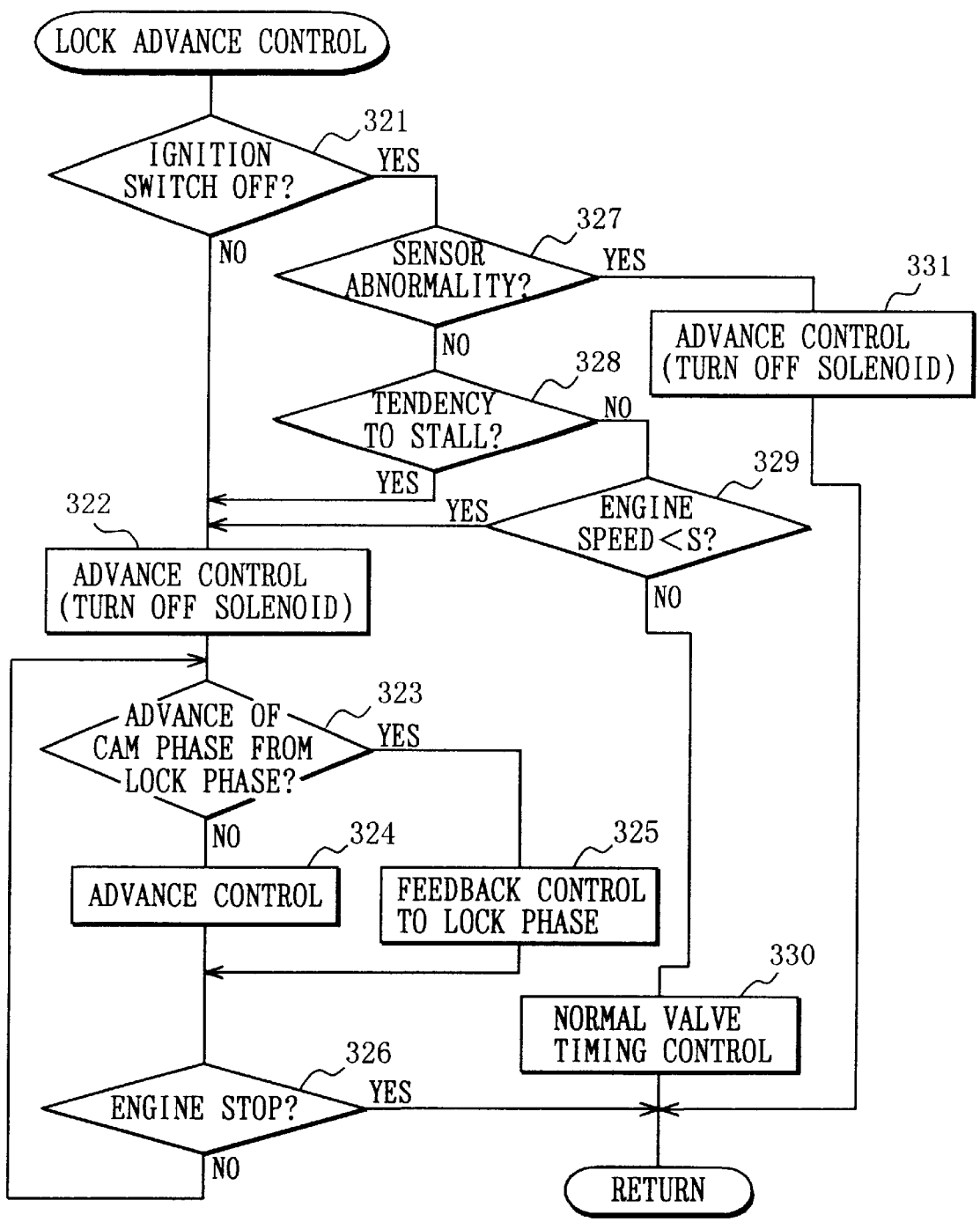
FIG. 26 is a flow chart showing processes of a lock advancing control program of the third embodiment.

Then, the engine control unit 21 controls the hydraulic pressure control valve 29 so as to advance the camshaft phase to lock it when the camshaft phase must be locked at the intermediate lock phase in stopping the engine for example by executing a lock advancing control program shown in FIG. 26 (lock advancing control).

The lock advancing control program in FIG. 26 is executed periodically during the operation of the engine control unit 21. When this program is activated, it is determined whether or not the engine stop command has been issued by checking whether or not the ignition switch 25 is turned off at step 321 at first. The process in this step 321 operates as engine stop command detecting means. Because the main relay 71 is held ON for a certain period even after the ignition switch 25 is turned off as described above, the lock advancing control described below may be executed during that period.

When it is determined at step 321 that the ignition switch 25 has been turned off and the engine stop command has been issued, the process advances to step 322 to start the camshaft phase advancing control. This advancing control is carried out by stopping power fed to the solenoid 53 of the hydraulic pressure control valve 29 to switch the valve to the position for supplying hydraulic pressure to the advancing chamber 42 by the spring 54 of the hydraulic pressure control valve 29, to activate the hydraulic pressure in the direction of advancing the camshaft phase and to discharge the hydraulic pressure of the retarding chamber 43 to the drain in the same time. The engine speed (number of revolutions of the oil pump 28) drops and the hydraulic pressure drops because the fuel injection is stopped after the engine stop command (FIG. 27), the advancing control can be made by the hydraulic pressure aided by force of the torsion coil spring 55 described above in the advancing direction when the engine speed is speed which allows idling.

After starting the advancing control, the process advances to step 323 to check whether or not the camshaft phase (actual valve timing of the intake valve) calculated based on the output signals of the crank angle sensor 20 and the cam angle sensor 19 has advanced over the intermediate lock phase. When the camshaft phase has not advanced over the intermediate lock phase, the process advances to step 324 to continue the camshaft phase advancing control (stop to feed power to the solenoid 53).

When it is determined that the camshaft phase has advanced over the intermediate lock phase at step 323, the process advances to step 325 to control the hydraulic pressure control valve 29 in feedback so as to match the camshaft phase with the intermediate lock phase.

Then, the process is advanced from step 324 or 325 to step 326 to check whether or not the engine 11 has been stopped (engine speed is zero). When the engine 11 has not stopped yet, the process returns to step 323 described above to repeat the camshaft phase advancing control or the feedback control to the intermediate lock phase at steps 323 and 325. When the force of the spring 62 of the lock pin 58 exceeds the hydraulic pressure as the hydraulic pressure drops due to the drop of the engine speed during the camshaft phase is controlled around the intermediate lock phase, the lock pin 58 protrudes and is fitted into the lock hole 59, thus locking the camshaft phase at the intermediate lock phase. Then, this program ends when it is determined that the engine has been stopped at step 326.

Meanwhile, when it is determined that the ignition switch 25 is ON at step 321, the process advances to step 327 to check whether or not the sensors (the crank angle sensor 20, the cam angle sensor 19 and others) used for the valve timing control has an abnormality. This Step 327 operates as abnormality checking means. When it is determined that the sensors have no abnormality, the process advances to step 328 to check whether or not an engine stall tends to occur, i.e., whether or not the vehicle is in a driving condition which tends to cause an engine stall. The tendency of the engine stall is determined by the scale of fluctuation of rotation of the engine in a low engine rotational area for example. The process at step 328 operates as engine stall tendency determining means. When it is determined that the engine tends to stall at step 328, the process advances to step 329 to determine whether or not the engine speed is less than a predetermined speed S. Here, the predetermined speed S is set at speed slightly higher than speed which disables to assure the hydraulic pressure required for advancing the camshaft phase to the intermediate lock phase.

When it is determined that the engine tends to stall at step 328 or when it is determined that the engine speed is less than the predetermined speed S at step 329, the process advances to step 322 to start the camshaft phase advancing control (stop power fed to the solenoid 53). Then, the camshaft phase advancing control or the feedback control to the intermediate lock phase is repeated until when the engine 11 stops (Steps 323 through 326). Thereby, the camshaft phase is locked at the intermediate lock phase by the lock pin 58 when the force of the spring 62 of the lock pin 58 exceeds the hydraulic pressure during the camshaft phase is controlled around the intermediate lock phase.

When it is determined to be "NO" at both steps 328 and 329 described above, the engine operating condition is determined to be normal and the process advances to step 330 to carry out the normal valve timing control for controlling the camshaft phase (actual valve timing) to the target phase (target valve timing).

When the sensor is determined to be abnormal at step 327 on the other hand, the camshaft phase cannot be controlled accurately to the target phase, so that the process advances to step 111 to carry out the camshaft phase advancing control (stop power fed to the solenoid 53). When the sensor has the abnormality, the camshaft phase advancing control is made until when the engine 11 stops and the camshaft phase is positioned at the advancing side rather than the intermediate lock phase.

Figure 27:
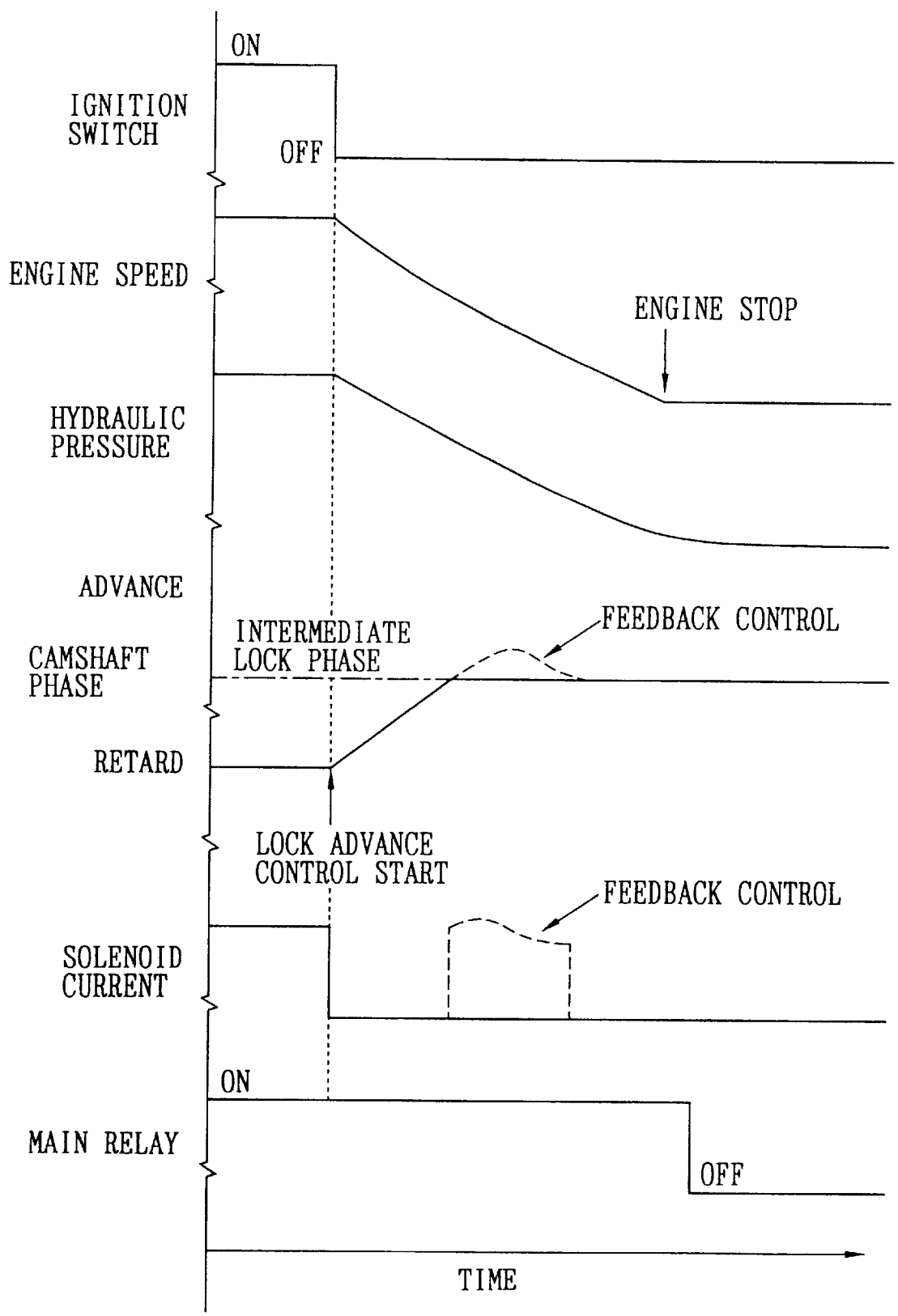
FIG. 27 is a time chart showing exemplary controls of the third embodiment.
Figure 28:
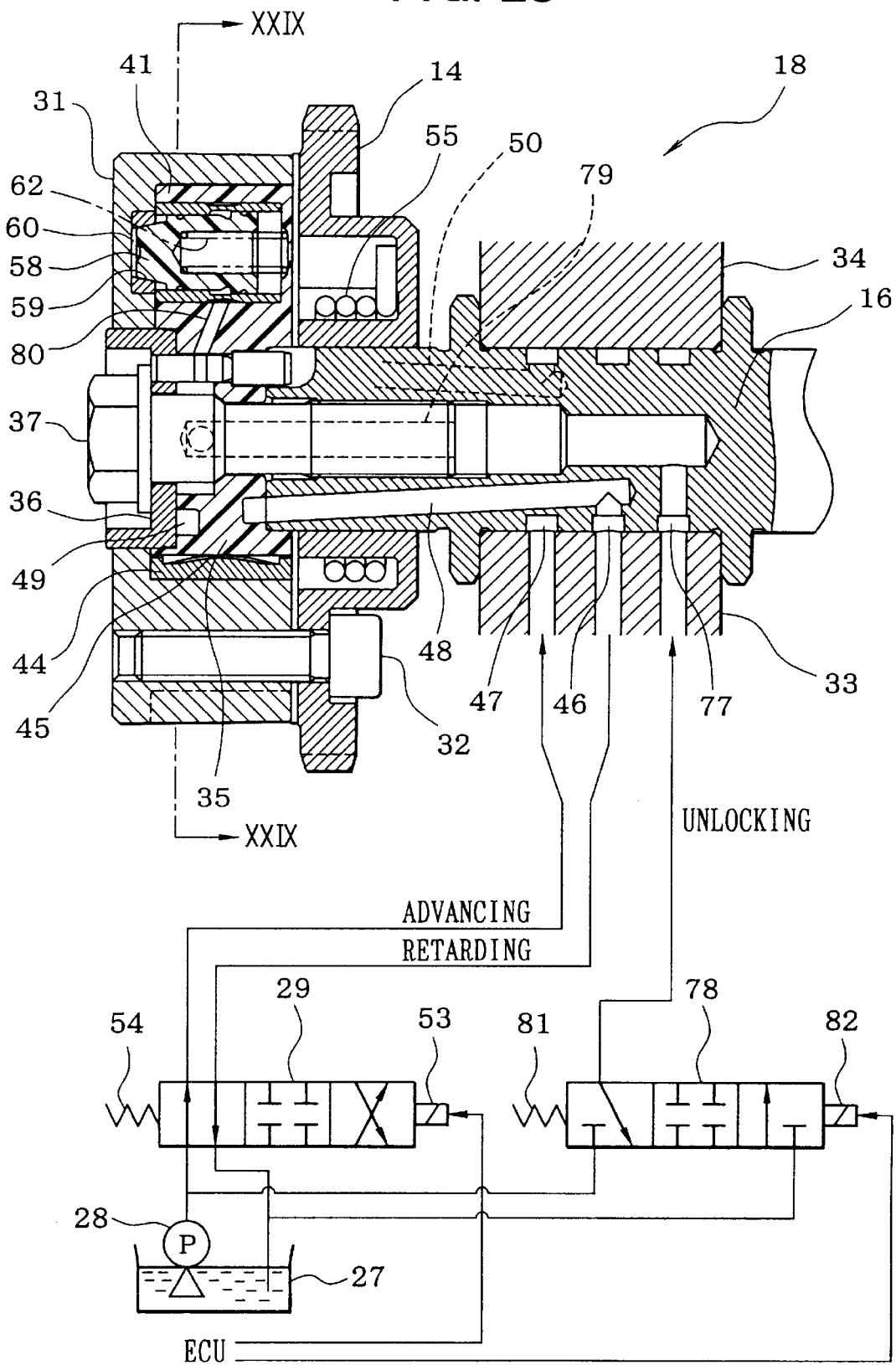
FIG. 28 is a longitudinal sectional view of a valve timing regulating unit according to a fourth embodiment of the invention.

An exemplary execution of the lock advancing control described above will be explained by using a time chart in FIG. 27. FIG. 27 shows an example applied to a system in which the camshaft phase is controlled to the retarding side rather than the intermediate lock phase in turning off the ignition switch 25 (during idling operation).

Because fuel injection is stopped when the ignition switch 25 is turned off, the engine speed (number of revolutions of the oil pump 28) drops and the hydraulic pressure drops. Then, the power fed to the solenoid 53 of the hydraulic pressure control valve 29 is stopped as the ignition switch 25 is turned off and the valve is switched to the position for supplying hydraulic pressure to the advancing chamber 42 by the spring 54 of the hydraulic pressure control valve 29. Thereby, the camshaft phase advancing control is started and the camshaft phase changes in the advancing direction.

After that, when the camshaft phase advances by passing the intermediate lock phase, the camshaft phase is returned to the intermediate lock phase by controlling the control current of the solenoid 53 in feedback. When the force of the spring 62 of the lock pin 58 exceeds the hydraulic pressure during the camshaft phase is controlled around the intermediate lock phase by the advancing control or the feedback control to the intermediate lock phase, the lock pin 58 is fitted into the lock hole 59 and the camshaft phase is locked at the intermediate lock phase. The engine 11 stops after that.

As it is apparent from the above description, the camshaft phase is advanced over the intermediate lock phase by the lock advancing control when the ignition switch 25 is turned off, so that the camshaft phase may be locked reliably at the intermediate lock phase by the lock advancing control even when the camshaft phase is located at the retarding side rather than the intermediate lock phase when the ignition switch 25 is turned off. Thereby, it is possible to improve the next engine startability and to prevent the noise which is otherwise caused by the vibration of the vane in cranking the engine.

Still more, because the feedback control to the intermediate lock phase is implemented when the camshaft phase is located at the advancing side rather than the intermediate lock phase or the camshaft phase advances by the lock advancing control by passing through the intermediate lock phase, the camshaft phase may be locked at the intermediate lock phase quickly and reliably by the feedback control.

However, it is possible to arrange so as not to implement the feedback control to the intermediate lock phase. The camshaft phase may be locked at the intermediate lock phase reliably also in this case when the camshaft phase advances over the intermediate lock phase by the lock advancing control because the camshaft phase always reaches to the intermediate lock phase during the process of changing to the retarding side due to the drop of hydraulic pressure caused by the drop of the engine speed (number of revolutions of the pump).

Further, because the lock advancing control is made also in the operating condition in which the engine stall is liable to occur, the camshaft phase may be locked at the intermediate lock phase reliably even when the engine stall occurs and the engine startability may be improved in the next time.

Here, because the hydraulic pressure drops when the engine speed (number of revolutions of the oil pump) drops, there is a possibility that the hydraulic pressure required for advancing the camshaft phase to the intermediate lock phase may not be assured when the engine speed becomes too low. However, because the lock advancing control is started when the engine speed drops below the predetermined speed S, i.e., before reaching to the low rotational area where the engine speed cannot assure the hydraulic pressure necessary for advancing the camshaft phase to the intermediate lock phase according to the third embodiment, it is possible to avoid the situation in which the camshaft phase cannot be advanced to the intermediate lock phase due to the drop of the hydraulic pressure caused by the drop of the engine speed.

Further, because the lock advancing control is implemented when it is determined that the sensor is abnormal, the camshaft phase may be positioned at the advancing side rather than the intermediate lock phase in stopping the engine 11 even when the camshaft phase cannot controlled to the target phase due to the abnormality of the sensor. Therefore, the camshaft phase always reaches the intermediate lock phase in the process of changing to the retarding side due to the drop of the hydraulic pressure caused by the drop of the engine speed (number of revolutions of the pump) when the engine is stopped even when the sensor is abnormal and the camshaft phase may be locked reliably at the intermediate lock phase.

It is noted that it is possible to implement the lock advancing control when the valve timing control is found to be abnormal when the whole valve timing control system including the sensors is monitored whether it is abnormal or not.

Further, because the hydraulic pressure control valve 29 is arranged so that the valve is switched automatically to the position for supplying the hydraulic pressure to the advancing chamber 42 by the spring 54 when the power fed to the solenoid 53 is stopped, the hydraulic pressure may be activated in the direction of advancing the camshaft phase continuously even when the main relay 71 is happened to be turned off on the way of the lock advancing control and the camshaft phase may be advanced over the intermediate lock phase. However, it is possible to arrange so that the hydraulic pressure operates in the direction of advancing the camshaft phase when power is fed to the solenoid 53.

Here, the camshaft phase may be locked at the intermediate lock phase without carrying out the lock advancing control in the state in which the camshaft phase is controlled to the advancing side over the intermediate lock phase when the ignition switch 25 is turned off. When the lock advancing control is made also in this case, the time for locking the camshaft phase at the intermediate lock phase is prolonged because the camshaft phase becomes distant from the intermediate lock phase by the lock advancing control.

Then, a process for checking whether or not the camshaft phase is positioned at the retarding side rather than the intermediate lock phase is added before step 322 in the lock advancing control program in FIG. 26 to implement the lock advancing control on and after step 322 only when it is determined that the camshaft phase is located at the retarding side rather than the intermediate lock phase. Thereby, the useless lock advancing control needs not be carried out when the lock advancing control is unnecessary and the time for locking the camshaft phase at the intermediate lock phase may be shortened.

It is noted that although the main relay 71 is held in ON state for a predetermined period of time even after the ignition switch 25 is turned off and the lock advancing control program in FIG. 26 may be executed during that period, the main relay 71 may be turned off in the same time when the ignition switch 25 is turned off to shut the supply of power of the system when it is arranged so that the valve of the hydraulic pressure control valve 29 is urged to the position for supplying the hydraulic pressure to the advancing chamber 42 by the spring 54. In this case, because the power fed to the solenoid 53 of the hydraulic pressure control valve 29 is stopped at the same time when the ignition switch 25 is turned off, the valve is switched to the position for supplying the hydraulic pressure to the advancing chamber 42 by the spring 54 of the hydraulic pressure control valve 29 and the hydraulic pressure operates in the direction of advancing the camshaft phase. Thereby, the camshaft phase may be advanced over the intermediate lock phase and the camshaft phase may be locked at the intermediate lock phase even when the power supply is shut off.

Fourth Embodiment

According to a fourth embodiment shown in FIGS. 28 through 31, the hydraulic pressure is supplied to the unlocking chamber 60 within the lock hole 59 through routes different from the advancing chamber 42 and the retarding chamber 43.

Figure 29:
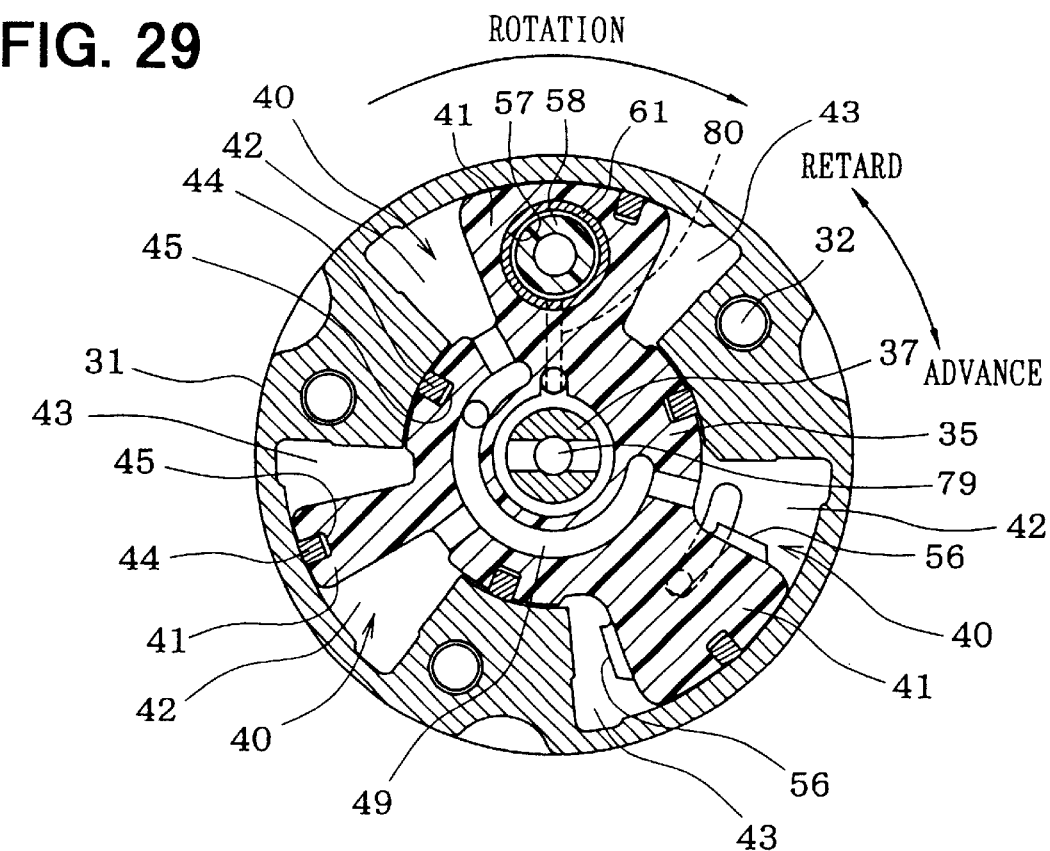
FIG. 29 is a sectional view taken along a line XXIX—XXIX in FIG. 28.
Figure 30:
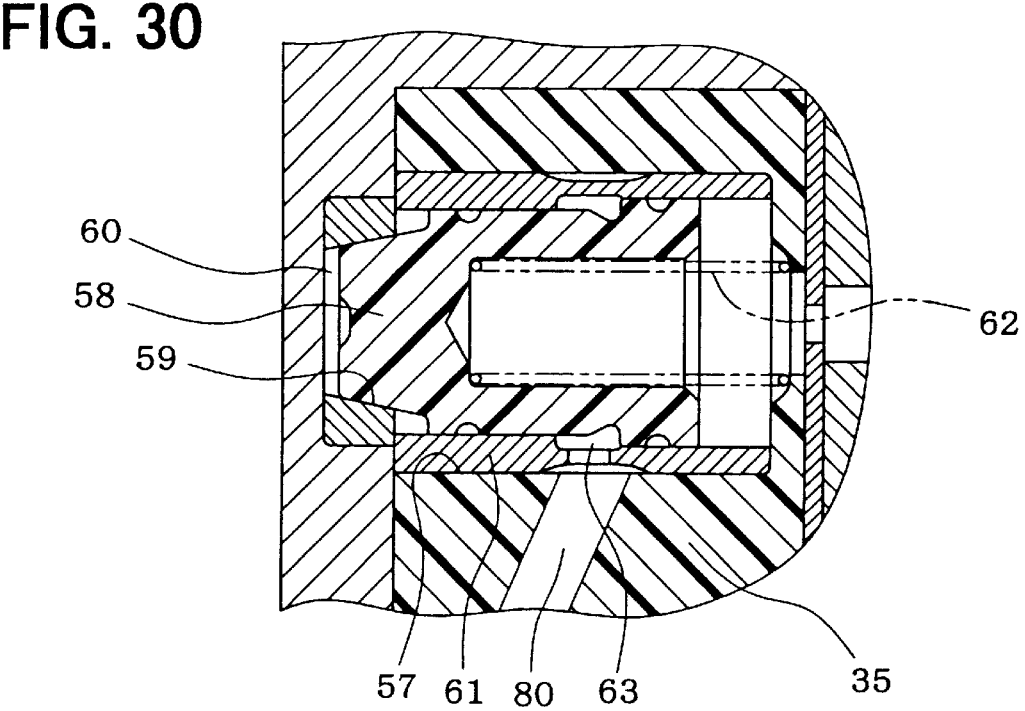
FIG. 30 is a partially enlarged sectional view showing the state in which the lock pin of the fourth embodiment is locked.
Figure 31:
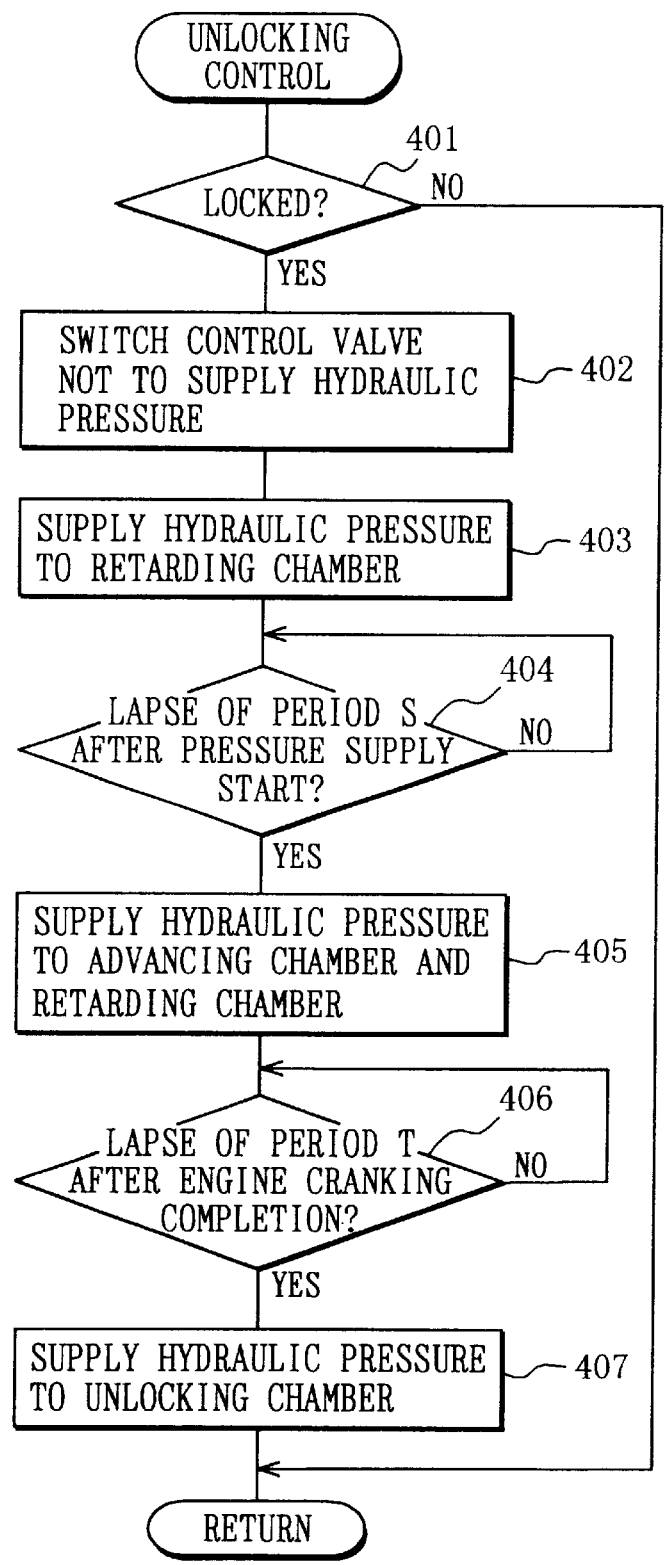
FIG. 31 is a flow chart showing processes of an unlock control program of the fourth embodiment.

As shown in FIGS. 28 through 31, an unlocking hydraulic pressure control valve (fluid pressure control means) 78 dedicated for unlock is provided beside the hydraulic pressure control valve 29 for controlling the hydraulic pressure of the advancing chamber 42 and the retarding chamber 43. A ringed unlocking groove 77 additionally formed at the periphery of the intake side camshaft 16 is connected to the unlock hydraulic pressure control valve 78, and oil pumped up by the oil pump 28 is supplied to the unlocking groove 77 via the unlock hydraulic pressure control valve 78. An unlocking oil path 79 connected to the unlocking groove 77 is formed so as to penetrate through the inside of the intake side camshaft 16 and the bolt 37 to communicate with a communication hole 80 formed within the rotor 35. This communication hole 80 is communicated with the unlocking groove 63 (FIGS. 29 through 31).

The unlock hydraulic pressure control valve 78 is a two-port three-position change-over valve which drives a valve by a solenoid 82 and a spring 81 and changes over the position of the valve among position for supplying the hydraulic pressure to the unlocking chamber 60 and the unlocking groove 63, the position for connecting the unlocking chamber 60 and the unlocking groove 63 to the drain and the position for connecting the unlocking chamber 60 and the unlocking groove 63 to neither one of the oil pump 28 and the drain.

According to the fourth embodiment, the engine control unit 21 executes an unlock control program in FIG. 31. According to this program, when it is determined to be locked at step 401, the process advances to step 402 to control the control current of the solenoid 82 of the unlock hydraulic pressure control valve 78 so that the valve is changed over to the position for supplying no hydraulic pressure to the unlocking chamber 60 and the unlocking groove 63, e.g., the position for connecting the unlocking chamber 60 and the unlocking groove 63 to the drain.

After that, the process advances to step 403 to control the control current of the solenoid 53 of the hydraulic pressure control valve 29 so that the hydraulic pressure is supplied only to the retarding chamber 43. Then, it is checked whether or not the predetermined period S has elapsed since the start of the supply of the hydraulic pressure to the retarding chamber 43 at step 404. Here, the predetermined period S is set at a time necessary for air within the unit to be pulled out as the hydraulic pressure is supplied. When the predetermined period S has not elapsed yet, it is determined that the air within the unit is not pulled out yet fully and the process stands by at step 404.

When it is determined that the predetermined period S has elapsed since the start of the supply of the hydraulic pressure to the retarding chamber 43 at step 407, it is determined that the air within the unit has been pulled out. Then, the process advances to step 205 to set the control current I of the solenoid 53 of the hydraulic pressure control valve 29 at the hold current Ih to supply the hydraulic pressure to the both of the advancing chamber 42 and the retarding chamber 43. Then, it is determined whether or not the period T has elapsed since the completion of cranking at step 406. This period T is calculated by a map or a functional expression in correspondence to the coolant temperature, engine temperature, fluid temperature and the like and is set at a time slightly longer than the time necessary for supplying the hydraulic pressure sufficient to control the camshaft phase from the completion of cranking. When the period T has not elapsed since the completion of cranking, it is determined that the hydraulic pressure sufficient for controlling the camshaft phase cannot be supplied and the process stands by at Step 406.

When it is determined that the period T has elapsed since the completion of cranking at step 406, it is determined that the hydraulic pressure sufficient for controlling the camshaft phase has been supplied. Then, the process advances to step 407 to control the control current of the solenoid 82 of the unlock hydraulic pressure control valve 78 so as to supply the hydraulic pressure to the unlocking chamber 60 and the unlocking groove 63 to unlock the lock pin 58.

Because no hydraulic pressure is supplied to the unlocking chamber 60 and the unlocking groove 63 in cranking the engine also in the fourth embodiment described above, it is possible to reliably prevent the lock pin 58 from being unlocked in cranking the engine and to avoid the problems of aggravation of startability, aggravation of the engine controllability and noise.

Here, although it is possible to supply the hydraulic pressure to the both of the advancing chamber 42 and the retarding chamber 43 in unlocking the lock pin 58 in the system of supplying the hydraulic pressure to the unlocking chamber 60 and the unlocking groove 63 through the routes different from the advancing chamber 42 and the retarding chamber 43, there is a possibility that a path for pulling out the air within the unit is eliminated and the air remains within the advancing chamber 42 or the retarding chamber 43, thus hampering the supplying the hydraulic pressure.

However, because the hydraulic pressure is supplied to the retarding chamber 43 to pull out the air within the unit at first in unlocking the lock pin 58 and the hydraulic pressure is supplied to the both of the advancing chamber 42 and the retarding chamber 43 after the elapse of the predetermined period S necessary for the air to be pulled out according to the fourth embodiment, it is possible to pull out the air within the unit every time when the unlock is carried out, to prevent the air from remaining in the advancing chamber 42 and the retarding chamber 43 and to prevent failure of supply of the hydraulic pressure which is otherwise caused by the air, thus improving the operating reliability.

It is noted that although the hydraulic pressure has been supplied to the both chambers 42 and 43 after supplying the hydraulic pressure to the retarding chamber 43 in the fourth embodiment, the hydraulic pressure may be supplied to the both chambers 42 and 43 after supplying the hydraulic pressure to the advancing chamber 42.

Further, although the hydraulic control of the advancing chamber 42 and the retarding chamber 43 and the hydraulic control of the unlocking chamber 60 and the unlocking groove 63 are made by the different control valves (the hydraulic pressure control valve 29 and the unlock hydraulic pressure control valve 78), the hydraulic control of the advancing chamber 42 and the retarding chamber 43 and the hydraulic control of the unlocking chamber 60 and the unlocking groove 63 may be carried out by one control valve.

Fifth Embodiment

Although the period for relaxing the abnormality checking condition is set by the elapsed time C2 after detecting unlock in the third embodiment, the timing for ending the period for relaxing or lowering the abnormality checking condition is determined by finding whether or not the actual valve timing VT (camshaft phase) stays within a predetermined range around the intermediate lock phase for more than a predetermined time after the unlock. That is, although the camshaft phase is pushed by the side where the hydraulic pressure is high and suddenly changes at the moment of unlock when the lock pin 58 is unlocked in the state in which the hydraulic pressure of the both advancing and retarding chambers 42 and 43 is not uniform, the camshaft phase may be controlled to the target value (around the intermediate lock phase) after that when the hydraulic pressure of the both advancing and retarding chambers 42 and 43 is balanced and the camshaft phase may be controlled. Accordingly, it may be determined that the control of the actual valve timing VT is stabilized when the actual valve timing VT stays within the predetermined range around the intermediate lock phase for more than the predetermined time after the unlock. In this case, the transient increase of the deviation $\Delta VT$ of the actual valve timing VT right after the unlock will not be erroneously determined as being abnormal even when the abnormality checking condition is returned to the normal value.

Figure 32:
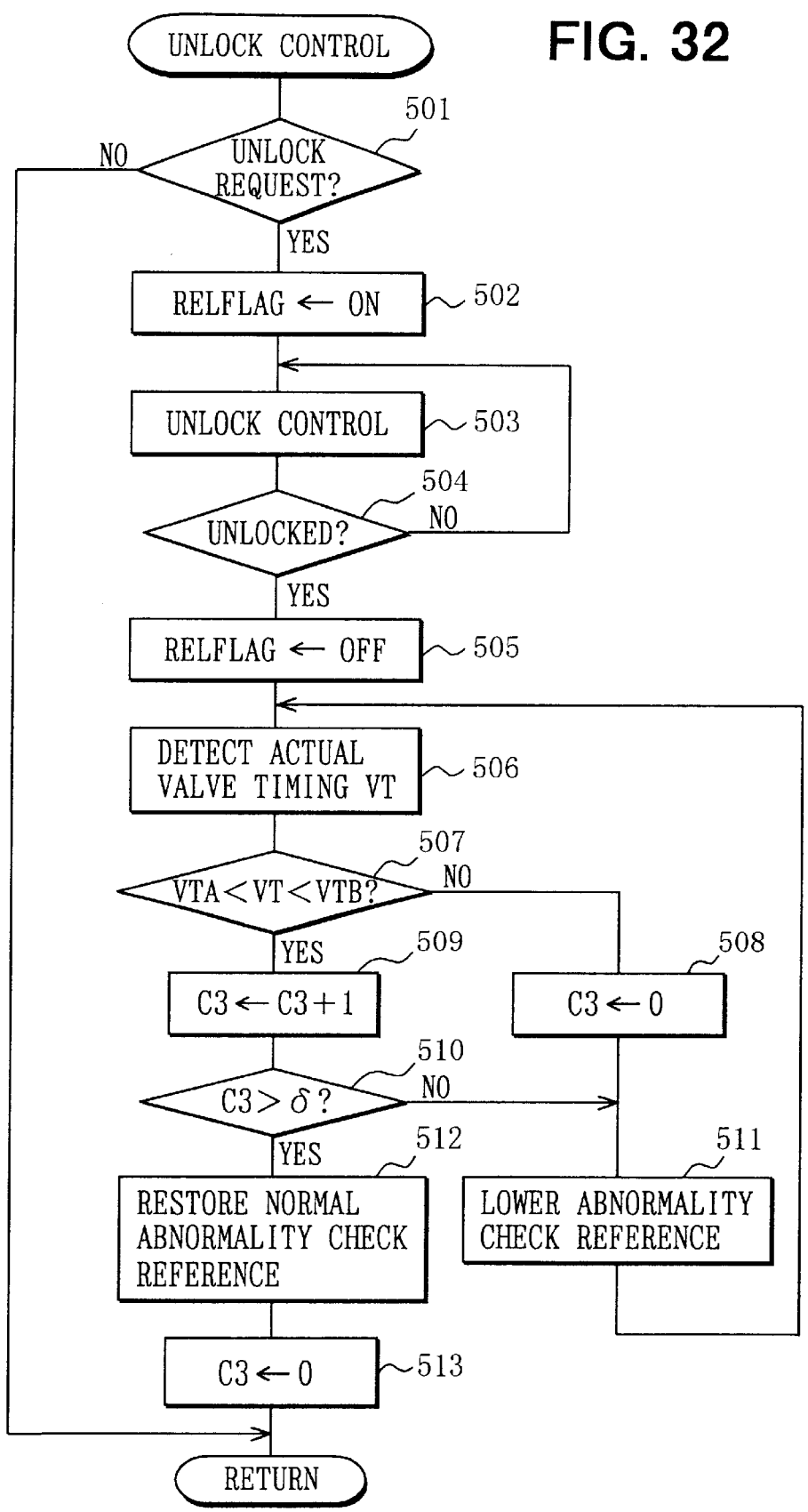
FIG. 32 is a flow chart showing processes of an unlock control program according to a fifth embodiment of the invention.

Accordingly, the relaxation/return of the abnormality checking condition is controlled by the unlock control program in FIG. 32. The same processes with Steps 311 through 315 in FIG. 24 are carried out also by this program at steps 501 through 505 to unlock the lock pin 58 corresponding to the unlock request and to switch the unlock request flag Relflag to "OFF".

After that, the process advances to step 507 after detecting the actual valve timing VT (actual advance angle of the intake side camshaft 16) of the intake valve based on the output signals of the crank angle sensor 20 and the cam angle sensor 19 at step 506 to determine whether or not the actual valve timing VT is within the predetermined range around the intermediate lock phase (VTA<VT<VTB). When the actual valve timing VT is not located within the predetermined range around the intermediate lock phase, the process advances to step 508 to reset the time counter for counting the time C3 in which the actual valve timing VT stays within the predetermined range around the intermediate lock phase. Then, the process advances to step 511 to relax the both or either one of the abnormality checking value α and the period β among the abnormality checking condition used in the abnormality checking program in FIG. 23 to avoid the transient increase of the deviation of the actual valve timing VT right after the unlock from being erroneously determined as being abnormal. Then, the process returns to step 506 described above.

Meanwhile, when the actual valve timing VT is located within the predetermined range around the intermediate lock phase, the process advances to step 509 to count up the value C3 of the time counter to count the time C3 in which the actual valve timing VT stays within the predetermined range around the intermediate lock phase. Then, it is determined whether or not this time C3 exceeds a period δ. When it does not exceed the period, the process advances to step 511 to relax the abnormality checking condition. Then, the process returns to step 506. The state in which the abnormality checking condition is relaxed is continued until when the time C3 in which the actual valve timing VT stays within the predetermined range around the intermediate lock phase exceeds the period δ by repeating such processes.

After that, the process advances to step 512 at the point of time when the time C3 in which the actual valve timing VT stays within the predetermined range around the intermediate lock phase exceeds the period to return the abnormality checking condition to the normal value. Then, the value C3 of the time counter is reset at step 513 and the program ends.

According to the fifth embodiment described above, it is possible to return the abnormality checking condition to the normal value and to reliably prevent the abnormality from being erroneously detected by determining whether or not the valve timing control is actually stabilized from the behavior of the actual valve timing VT (camshaft phase) after the unlock.

Sixth Embodiment

Although the lock pin 58 is unlocked immediately at the point of time when the engine speed rises to the predetermined speed or more after the cranking of the engine in the third and fifth embodiments, there is a case when the lock pin 58 is hardly fitted to the lock hole 59 when the engine is stopped by such arrangement. For instance, when the engine 11 is stopped before the oil temperature rises in a cold time, the viscosity of the oil within the hydraulic circuit is large and the fluidity of the oil is bad. Accordingly, oil is hardly pulled out of the lock hole 59 and the lock pin 58 is hardly fitted into the lock hole 59. When the lock pin 58 is unlocked while operating the engine in such state, the lock pin 58 is hardly fitted into the lock hole 59 and the camshaft phase may not be locked at the intermediate lock phase in stopping the engine afterward.

Figure 33:
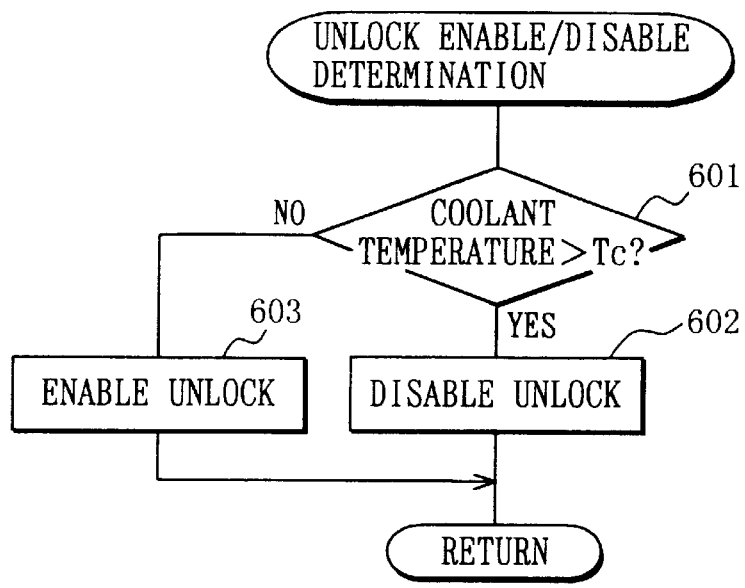
FIG. 33 is a flow chart showing processes of an unlock enable/disable determination program according to a sixth embodiment of the invention.

Then, according to the sixth embodiment, unlock of the lock pin 58 is disabled until the camshaft phase becomes movable after the cranking of the engine by an unlock enable/disable determination program in FIG. 33. According to the present embodiment, it is determined whether or not the camshaft phase is movable by using the coolant temperature which is substitute information of the oil temperature by considering that the move of the camshaft phase changes depending on the viscosity (oil temperature) of oil within the hydraulic circuit.

When the unlock enable/disable determination program in FIG. 33 is activated, it is checked at step 601 whether or not the coolant temperature is lower than predetermined temperature Tc. When the coolant temperature is lower than the predetermined temperature Tc, it is determined that the viscosity of the oil within the hydraulic circuit is large and the lock pin 58 is hardly fitted into the lock hole 59. Then, the process advances to step 602 to disable the unlock. In this case, the operation of the engine is continued while locking the lock pin 58 and no valve timing control is made.

Then, at the point of time when the coolant temperature rises over the predetermined temperature, it is determined that the camshaft phase is movable. Then, the process advances to step 603 to enable the unlock. The unlocking control is executed when the other unlock condition holds in this case. Then, the lock pin 58 is unlocked and the normal valve timing control is started.

According to the sixth embodiment, the unlock of the lock pin 58 is disabled until when the camshaft phase becomes movable after the cranking of the engine, so that the engine 11 is stopped in the state in which the camshaft phase is locked by the lock pin 58 when the engine 11 is stopped before the camshaft phase becomes movable after the crank. Therefore, the engine may be cranked in the state in which the camshaft phase is locked firmly by the lock pin 58 in cranking the engine in the next time and it is possible to avoid the problems of aggravation of startability and noise caused by the failure of the lock.

It is possible to determine whether or not the camshaft phase is movable by using the oil temperature and the engine temperature. It is also possible to disable the unlock of the lock pin 58 by determining that the motion of the camshaft phase is bad when an abnormality is detected in the valve timing control system.

Seventh Embodiment

Figure 34:
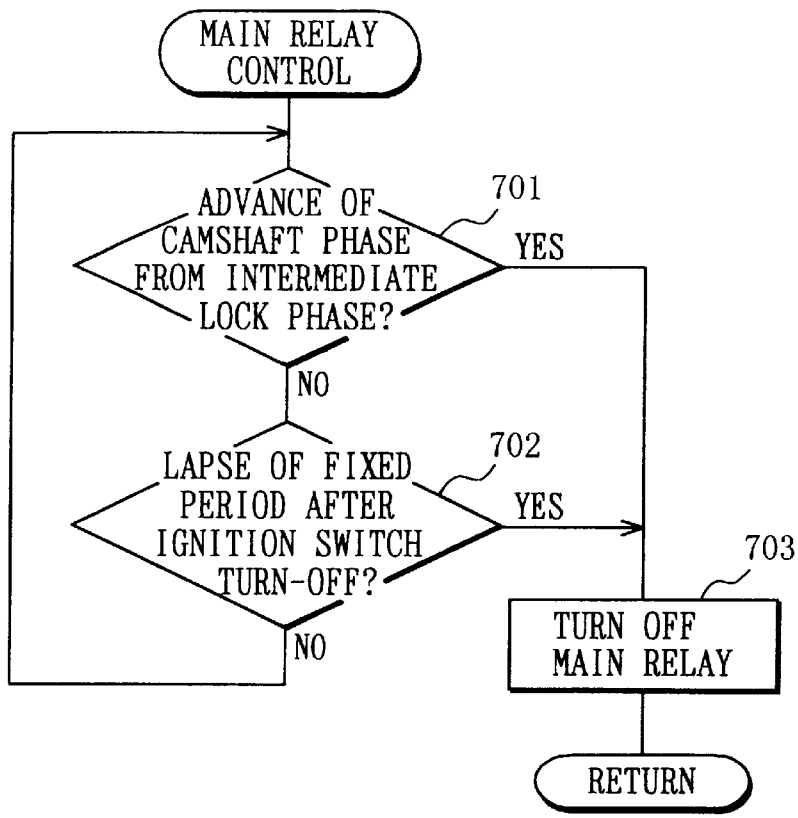
FIG. 34 is a flow chart showing processes of a main relay control program according to a seventh embodiment of the invention.

According to a seventh embodiment, the main relay 710 is turned off immediately at the point of time when the camshaft phase advances to the intermediate lock phase. That is, the engine control unit 21 executes a main relay control program in FIG. 34 together with the lock advancing control program in FIG. 26 (third embodiment). The main relay control program in FIG. 34 is activated in the same time with the ignition switch 25 and operates as main relay control means. In the program, a process (step 701) for determining whether or not the camshaft phase has advanced over the intermediate lock phase and a process (step 702) for determining whether or not the predetermined time has elapsed since when the ignition switch 25 has been turned off are repeated at predetermined period. Here, the predetermined time is set by giving a certain degree of margin to the time necessary for advancing the camshaft phase over the intermediate lock phase for example.

After that, when it is determined to be "YES" in either one of steps 701 and 702, the process advances to step 703 to turn off the main relay 71 and to end the program. It is noted that the main relay 71 is turned off immediately at the point of time when the camshaft phase has advanced to the intermediate lock phase, the processes of the feedback control to the intermediate lock phase (Steps 323 and 325) become unnecessary when the lock advancing control program in FIG. 26 is executed.

Figure 35:
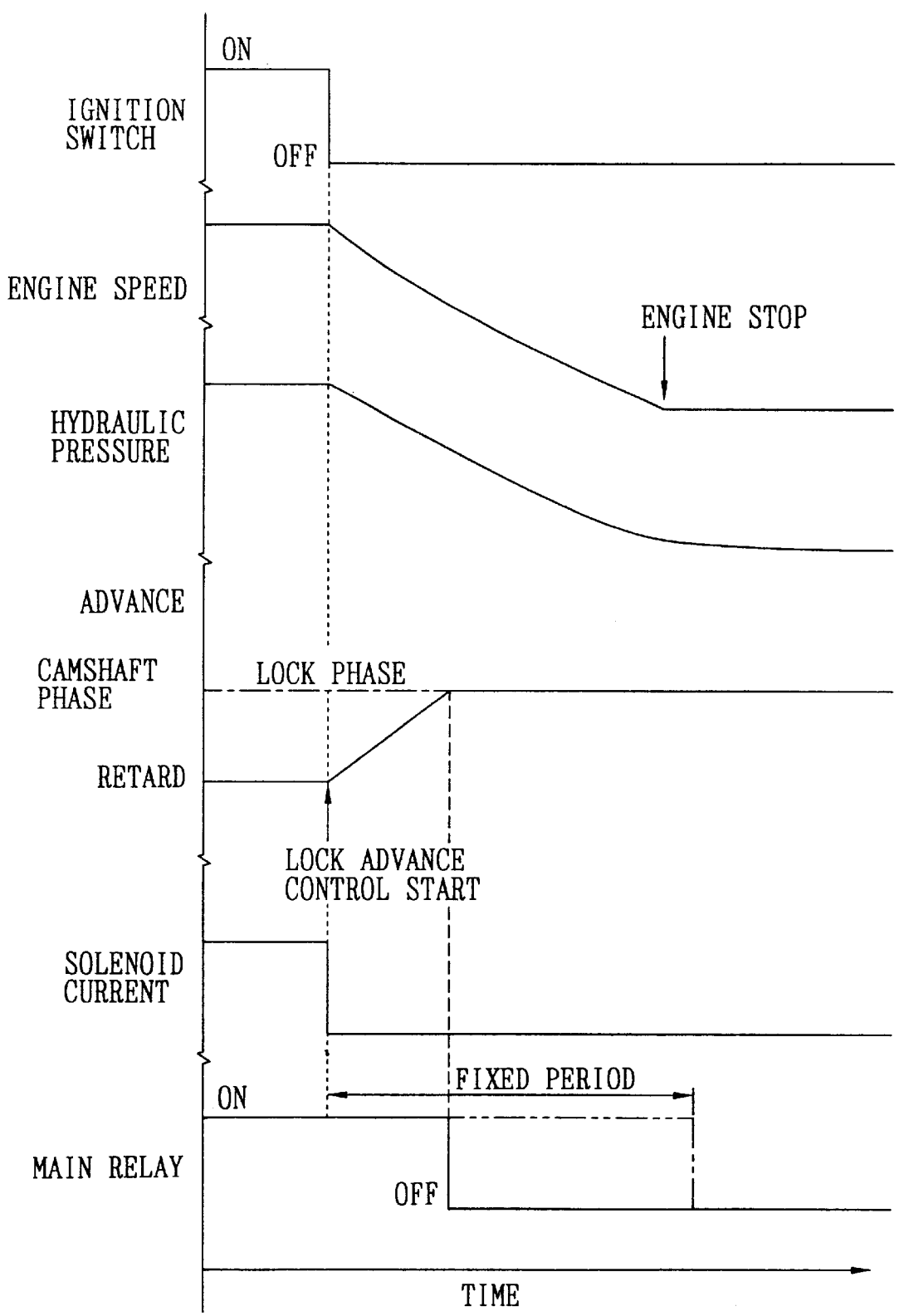
FIG. 35 is a time chart showing exemplary control of the seventh embodiment.
Figure 36:
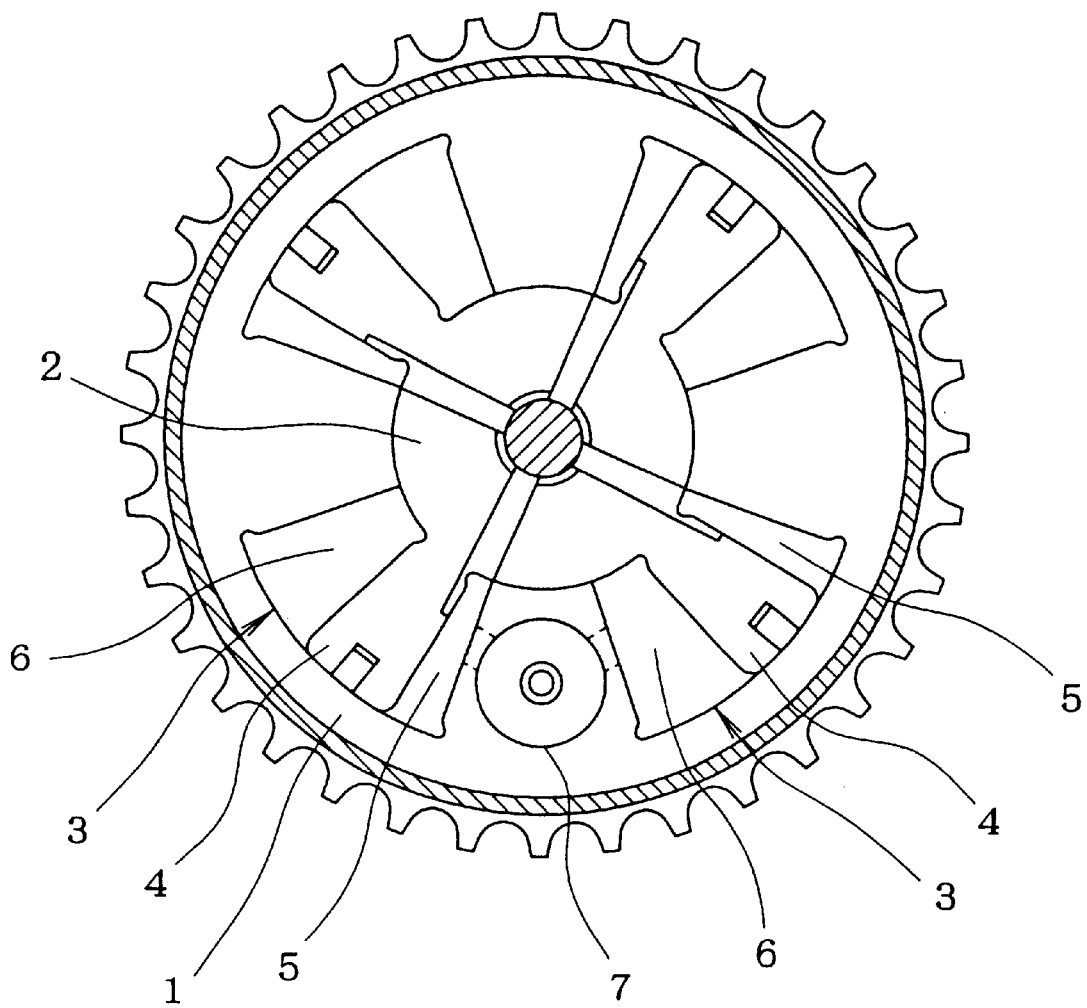
FIG. 36 is a sectional view of a prior art valve timing regulating unit.

According to the seventh embodiment described above, the main relay 710 is turned off (solid line in FIG. 35) at the point of time when the camshaft phase reaches to the intermediate lock phase by the lock advancing control as shown in FIG. 35. Thereby, ON time (power supplying time) of the main relay 710 after the ignition switch 25 has been turned off may be always set at minimum. Further, as a fail-safe when the system error has occurred, the main relay 710 is turned off at the point of time when the period T has elapsed when the camshaft phase cannot advance over the intermediate lock phase until when the predetermined time elapses since when the ignition switch 25 has been turned off (dotted chain line in FIG. 35). Thereby, it is possible to prevent the situation in which the main relay 710 is kept ON for a long period of time when the system is abnormal. However, it is possible to eliminate the process of step 702 in FIG. 34.

Although the respective embodiments described above have been what the present invention is applied to the variable valve timing control apparatus of the intake valve, the invention may be applied to a variable valve timing control apparatus of an exhaust valve. Other than that, the structure of the valve timing regulating unit may be modified. In short, it will do when it is the valve timing regulating unit of the type of locking the camshaft phase at the intermediate lock phase.

What is claimed is:

1. A variable valve timing control apparatus for an internal combustion engine, said apparatus comprising:
   a first rotary body, which rotates in synchronism with a crankshaft of the internal combustion engine;
   a second rotary body which is concentric with the first rotary body and is linked to a camshaft for opening/closing an engine valve;
   a vane attached to either the first rotary body or the secondary rotary body to divide a fluid chamber formed between the rotary bodies into an advancing chamber and a retarding chamber;
   fluid pressure control means for controlling the pressure of fluid supplied to the advancing chamber and retarding chamber;
   valve timing control means for variably controlling valve timing of the engine by changing the phase of the camshaft with respect to the crankshaft by relatively turning the first rotary body and the secondary rotary body;
   lock means for locking the camshaft phase at an intermediate lock phase within its controllable range when the internal combustion engine is stopped or when cranking the engine;
   an unlocking chamber to which fluid pressure for unlocking the camshaft phase of the lock means is supplied; and
   unlock control means for positively preventing fluid pressure within the unlocking chamber from increasing when cranking the engine,
   wherein the unlocking chamber is communicated with the retarding chamber and is supplied with fluid pressure from the retarding chamber; and
   the unlock control means controls the fluid pressure control means so that the fluid pressure is supplied only to the advancing chamber in cranking the engine.

2. A variable valve timing control apparatus as in claim 1, wherein:
   the unlock control means continues to positively prevent the pressure in the unlock chamber from increasing a predetermined period elapses from the completion of cranking.

3. A variable valve timing control apparatus as in claim 1, wherein:
   the unlock control means starts to supply fluid pressure to the unlocking chamber when the fluid pressure controlled by the fluid pressure control means becomes greater than a predetermined pressure.

4. A variable valve timing control apparatus as in claim 1, wherein:
   the unlock control means unlocks the lock means by increasing the fluid pressure in the unlocking chamber when the fluid pressure is increased in at least one of the advancing chamber and the retarding chamber.

5. A variable valve timing control apparatus as in claim 1, wherein:
   the unlock control means unlocks the lock means by controlling the fluid pressure control means to increase the fluid pressure in the advancing and retarding chambers.

6. A variable valve timing control apparatus for an internal combustion engine, said apparatus comprising:
   a first rotary body, which rotates in synchronism with a crankshaft of the internal combustion engine;
   a second rotary body which is concentric with the first rotary body and is linked to a camshaft for opening/closing an engine valve;
   a vane attached to either the first rotary body or the secondary rotary body to divide a fluid chamber formed between the rotary bodies into an advancing chamber and a retarding chamber;
   fluid pressure control means for controlling the pressure of fluid supplied to the advancing chamber and retarding chamber;
   valve timing control means for variably controlling valve timing of the engine by changing the phase of the camshaft with respect to the crankshaft by relatively turning the first rotary body and the secondary rotary body;
   lock means for locking the camshaft phase at an intermediate lock phase within its controllable range when the internal combustion engine is stopped or when cranking the engine;
   an unlocking chamber to which fluid pressure for unlocking the camshaft phase of the lock means is supplied; and
   unlock control means for positively preventing fluid pressure within the unlocking chamber from increasing when cranking the engine,
   wherein the unlocking chamber is communicated with the advancing chamber and is supplied with fluid pressure from the advancing chamber; and
   the unlock control means controls the fluid pressure control means so that the fluid pressure is supplied only to the retarding chamber in cranking the engine.

7. A variable valve timing control apparatus for an internal combustion engine, said apparatus comprising:
- a first rotary body, which rotates in synchronism with a crankshaft of the internal combustion engine;
- a second rotary body which is concentric with the first rotary body and is linked to a camshaft for opening/closing an engine valve;
- a vane attached to either the first rotary body or the secondary rotary body to divide a fluid chamber formed between the rotary bodies into an advancing chamber and a retarding chamber;
- fluid pressure control means for controlling the pressure of fluid supplied to the advancing chamber and retarding chamber;
- valve timing control means for variably controlling valve timing of the engine by changing the phase of the camshaft with respect to the crankshaft by relatively turning the first rotary body and the secondary rotary body;
- lock means for locking the camshaft phase at an intermediate lock phase within its controllable range when the internal combustion engine is stopped or when cranking the engine;
- an unlocking chamber to which fluid pressure for unlocking the camshaft phase of the lock means is supplied; and
- unlock control means for positively preventing fluid pressure within the unlocking chamber from increasing when cranking the engine,
- wherein the unlock control means continues to positively prevent the pressure in the unlock chamber from increasing a predetermined period elapses from the completion of cranking; and
- the predetermined period is determined by the temperature of the fluid.

8. A variable valve timing control apparatus for an internal combustion engine, said apparatus comprising:
- a first rotary body, which rotates in synchronism with a crankshaft of the internal combustion engine;
- a second rotary body which is concentric with the first rotary body and is linked to a camshaft for opening/closing an engine valve;
- a vane attached to either the first rotary body or the secondary rotary body to divide a fluid chamber formed between the rotary bodies into an advancing chamber and a retarding chamber;
- fluid pressure control means for controlling the pressure of fluid supplied to the advancing chamber and retarding chamber;
- valve timing control means for variably controlling valve timing of the engine by changing the phase of the camshaft with respect to the crankshaft by relatively turning the first rotary body and the secondary rotary body;
- lock means for locking the camshaft phase at an intermediate lock phase within its controllable range when the internal combustion engine is stopped or when cranking the engine;
- an unlocking chamber to which fluid pressure for unlocking the camshaft phase of the lock means is supplied; and
- unlock control means for positively preventing fluid pressure within the unlocking chamber from increasing when cranking the engine,
- wherein the unlock control means continues to positively prevent the pressure in the unlock chamber from increasing a predetermined period elapses from the completion of cranking; and
- the predetermined period is determined by the temperature of an engine coolant fluid.

9. A variable valve timing control apparatus for an internal combustion engine, said apparatus comprising:
- a first rotary body, which rotates in synchronism with a crankshaft of the internal combustion engine;
- a second rotary body which is concentric with the first rotary body and is linked to a camshaft for opening/closing an engine valve;
- a vane attached to either the first rotary body or the secondary rotary body to divide a fluid chamber formed between the rotary bodies into an advancing chamber and a retarding chamber;
- fluid pressure control means for controlling the pressure of fluid supplied to the advancing chamber and retarding chamber;
- valve timing control means for variably controlling valve timing of the engine by changing the phase of the camshaft with respect to the crankshaft by relatively turning the first rotary body and the secondary rotary body;
- lock means for locking the camshaft phase at an intermediate lock phase within its controllable range when the internal combustion engine is stopped or when cranking the engine;
- an unlocking chamber to which fluid pressure for unlocking the camshaft phase of the lock means is supplied;
- unlock control means for positively preventing fluid pressure within the unlocking chamber from increasing when cranking the engine; and
- hold current learning means for learning a hold current of the fluid pressure control means for holding the camshaft phase,
- wherein the unlock control means sets a control current of the fluid pressure control means in unlocking the lock means around the hold current learned by the hold current learning means.

10. A variable valve timing control apparatus for an internal combustion engine, said apparatus comprising:
- a first rotary body, which rotates in synchronism with a crankshaft of the internal combustion engine;
- a second rotary body which is concentric with the first rotary body and is linked to a camshaft for opening/closing an engine valve;
- a vane attached to either the first rotary body or the secondary rotary body to divide a fluid chamber formed between the rotary bodies into an advancing chamber and a retarding chamber;
- fluid pressure control means for controlling the pressure of fluid supplied to the advancing chamber and retarding chamber;
- valve timing control means for variably controlling valve timing of the engine by changing the phase of the camshaft with respect to the crankshaft by relatively turning the first rotary body and the secondary rotary body;
- lock means for locking the camshaft phase at an intermediate lock phase within its controllable range when the internal combustion engine is stopped or when cranking the engine;

an unlocking chamber to which fluid pressure for unlocking the camshaft phase of the lock means is supplied;

unlock control means for positively preventing fluid pressure within the unlocking chamber from increasing when cranking the engine; and hold current calculating means for calculating a hold current of the fluid pressure control means for holding the camshaft phase based on temperature information such as the temperature of the fluid, a coolant temperature or the engine temperature, wherein the unlock control means sets the control current of the fluid pressure control means in unlocking the lock means around the hold current calculated by the hold current calculating means.

11. A variable valve timing control apparatus as in claim 10, wherein:

the unlock control means sets the control current of the fluid pressure control means in unlocking the lock means to a value obtained by offsetting the hold current by a predetermined value.

12. A variable valve timing control apparatus of an internal combustion engine, said apparatus comprising:

valve timing control means for variably controlling valve timing by changing a rotational phase of a camshaft with respect to a crankshaft of the internal combustion engine by hydraulic pressure;

lock means urged to lock the camshaft phase at an intermediate lock phase located almost at the intermediate position of its controllable range when the internal combustion engine is stopped or is cranked;

abnormality determination means for determining whether or not the valve timing control means is abnormal; and abnormality determination standard relaxing means for relaxing a standard for the abnormality determination for a predetermined time period after the lock means is unlocked to prevent the unlocking from causing a false abnormality detection, wherein the abnormality determination standard relaxing means returns the abnormality determination standard to a normal value after the elapse of a predetermined period from when the unlocked state of the lock means is detected;

the abnormality determination standard relaxing means sets the predetermined period based on the temperature of at least one of oil, a coolant and the engine.

13. A variable valve timing control apparatus as in claim 12, wherein:

the abnormality determination standard relaxing means returns the abnormality determination standard to a normal value when the camshaft phase stays within a predetermined range for more than a predetermined time after unlocking the lock means.

14. A variable valve timing control apparatus of an internal combustion engine, said apparatus comprising:

valve timing control means for variably controlling valve timing by changing a rotational phase of a camshaft with respect to a crankshaft of the internal combustion engine by hydraulic pressure;

lock means for locking the camshaft phase at an intermediate lock phase, which is located approximately midway in its controllable range when the internal combustion engine is stopped or is cranked; and unlock disabling means for preventing the lock means from unlocking until the camshaft phase is determined to be movable after the engine has been started, wherein:

the unlock disabling means determines whether or not the camshaft phase is movable based on the temperature of at least one of engine oil, a coolant and the engine.

15. An apparatus as in claim 14 including abnormality determination means for determining whether or not the valve timing control means is abnormal, wherein the unlock disabling means determines that the camshaft phase is movable when no abnormality is determined by the abnormality determination means.

* * * * *